(12) United States Patent
Yamazaki et al.

(10) Patent No.: US 10,244,160 B2
(45) Date of Patent: Mar. 26, 2019

(54) FOCUS ADJUSTMENT DEVICE AND FOCUS ADJUSTMENT METHOD

(71) Applicant: Olympus Corporation, Hachioji-shi, Tokyo (JP)

(72) Inventors: Yukie Yamazaki, Hachioji (JP); Kazumasa Kunugi, Hino (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/838,124

(22) Filed: Dec. 11, 2017

(65) Prior Publication Data

US 2018/0176453 A1 Jun. 21, 2018

(30) Foreign Application Priority Data

Dec. 15, 2016 (JP) .................. 2016-243307

(51) Int. Cl.
*G02B 7/04* (2006.01)
*G02B 7/34* (2006.01)
*H04N 5/232* (2006.01)

(52) U.S. Cl.
CPC ........... *H04N 5/23212* (2013.01); *G02B 7/04* (2013.01); *G02B 7/34* (2013.01)

(58) Field of Classification Search
CPC ......... H04N 5/23212; G02B 7/34; G02B 7/04
See application file for complete search history.

(56) References Cited

U.S. PATENT DOCUMENTS

| 7,933,510 | B2 | 4/2011 | Ichimiya | |
|---|---|---|---|---|
| 2008/0267601 | A1* | 10/2008 | Kobayashi | G03B 13/32 348/345 |
| 2013/0335614 | A1* | 12/2013 | Ichimiya | G02B 7/346 348/333.11 |
| 2015/0222807 | A1* | 8/2015 | Yamamoto | G02B 7/34 348/349 |

* cited by examiner

*Primary Examiner* — Gevell V Selby
(74) *Attorney, Agent, or Firm* — John C. Pokotylo; Pokotylo Patent Services

(57) ABSTRACT

In a focus adjustment device that images a subject that has been subjected to pupil division to generate image data, and carries out a focus adjustment operation based on the image data, a focus adjustment operation is carried out based on a first phase difference amount in the event that it has been determined that the first phase difference amount is larger than a first threshold value, and then by executing focus detection after the focus adjustment operation, in the event that it has been determined that reliability of both the first phase difference amount and the second phase difference amount is high, and that a difference between the two is smaller than a second threshold value, and that it has been determined that the first phase difference amount is smaller than the first threshold value, a focus adjustment operation is carried out based on a second phase difference amount.

18 Claims, 20 Drawing Sheets

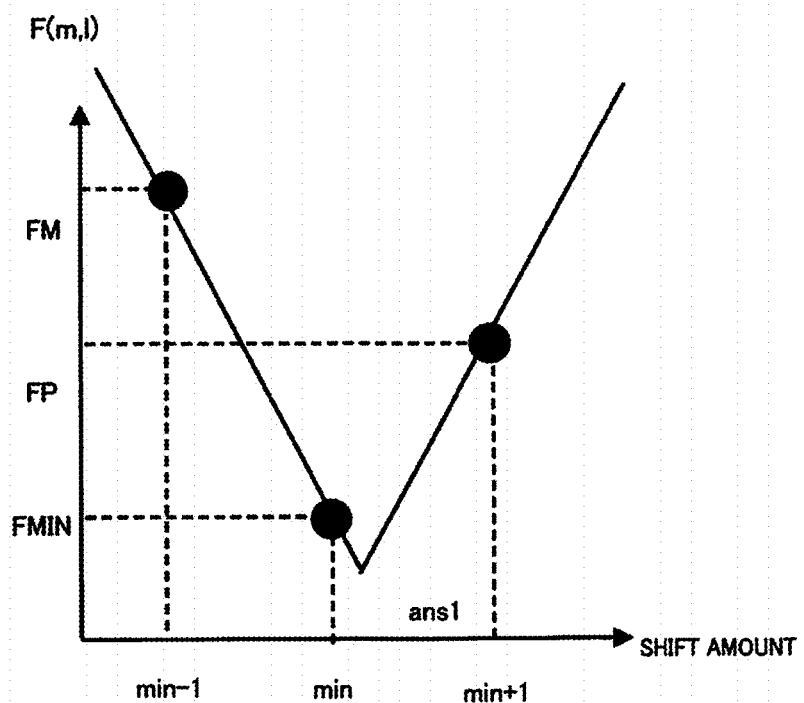

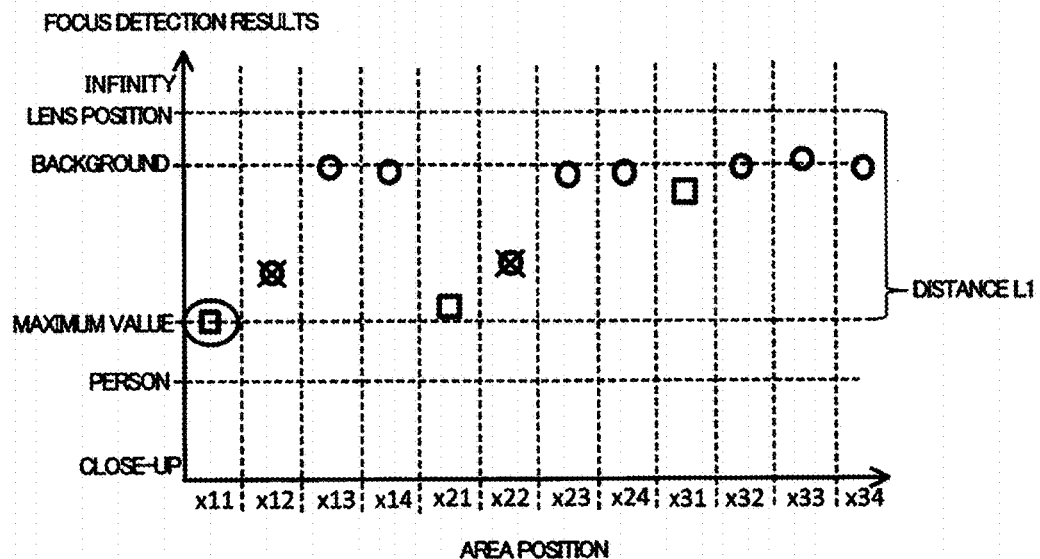
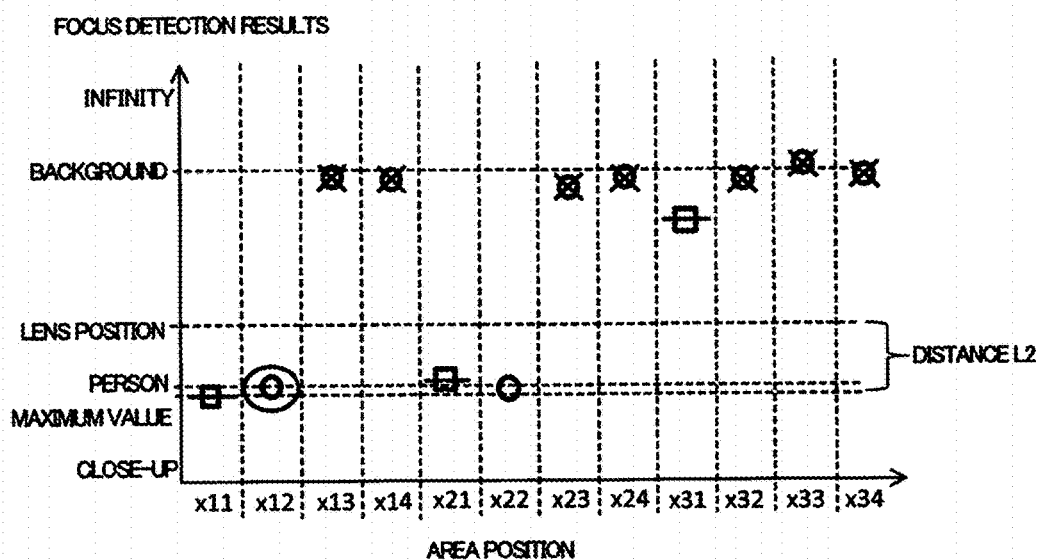

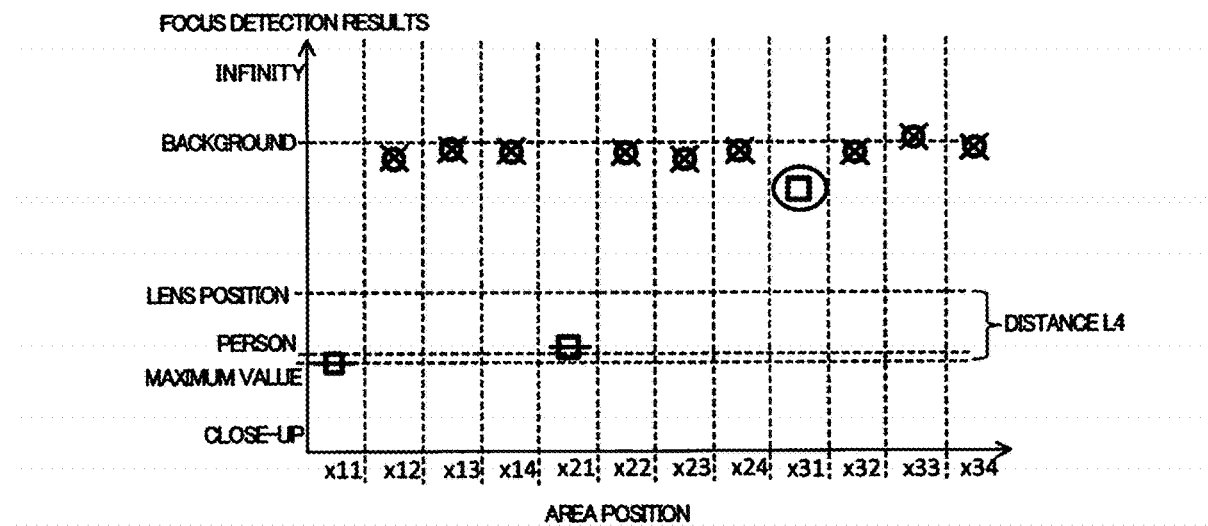
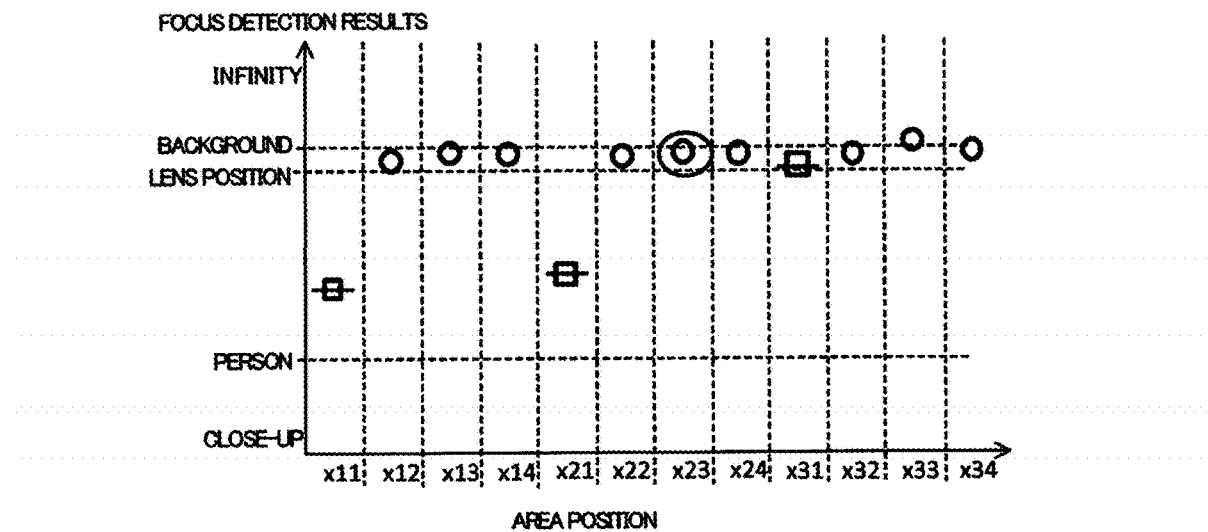

FOCUS ADJUSTMENT DEVICE AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2016-243307 filed on Dec. 15, 2016. This application is expressly incorporated herein by reference. The scope of the present invention is not limited to any requirements of the specific embodiments described in the application.

BACKGROUND OF THE INVENTION

1. Field of the Invention

The present invention relates to a focus adjustment device, having a photographing lens that includes a focus lens, that receives light of a subject image that has been subjected to pupil division by means of this photographing lens and generates image data, and carries out focus adjustment based on this image data, and to a focus adjustment method.

2. Description of the Related Art

There are various focus adjustment devices that calculate defocus amount of a photographing lens by subjecting subject light flux from the photographing lens to pupil division and detecting phase difference of resulting subject images, and carry out focus adjustment based on this defocus amount, and these devices have been proposed and marketed. With this phase difference AF, it is possible to freely set a range in which distance measurement is possible on a shooting screen. By dividing a distance measurement range into a plurality of regions, and calculating image deviation amount of a subject in each region, multipoint focus detection regions are possible. However, in regions that have been divided, focus detection is no longer possible for image deviation amount required in a significantly defocused state.

A focus adjustment device that can perform focus detection in a significantly defocused state by setting a focus detection region of a required size in the center of a line sensor, based on maximum defocus amount of an interchangeable lens and maximum defocus amount generated and acquired at a current lens position has therefore been proposed in Japanese patent publication number 464-1502 (hereafter referred to as "patent publication 1").

With the focus adjustment device of patent publication 1, size of a focus detection region is set based on maximum defocus amount of an interchangeable lens and maximal defocus amount that can be generated at a current lens position. However, depending on conditions a focus detection region may be set widely, and it is likely that a far and near mixed state, where subjects that are far away and subjects that are close are mixed together, will arise, and hunting will occur, where the focus lens is repeatedly moved backwards and forwards. Further, despite a photographer wanting to focus on a subject in the distance that exists in a narrow focus detection region, a subject that happens to be nearby and detected at a position away from the intended position due a wide focus detection region, and this subject is focused on, resulting in the possibility of obtaining results that are different from the photographer's intention.

On the other hand, in a case where the subject is close to in focus, it is possible to detect necessary image deviation amount even for a narrow focus detection region, but normally, in order to calculate a wide focus detection region unnecessary calculation is increased. In this case, in order to reduce calculation amount, there is a method of detecting image deviation amount by simplifying a wide focus detection region to a size that is equivalent to a narrow focus detection region by moving average processing and thinning, but errors are included in the results of such detection, and accuracy of detection results becomes bad. However, in order to improve accuracy of detection results for a wide focus detection region, if calculation is carried out without simplification in a wide focus detection region device it invites increase in scale of the calculation circuit, and this hinders the speeding up of processing time.

Thus, in order to focus on the subject that is in a significantly defocused state, a wide focus detection region is required, while in order to prevent erroneous focusing on both near and far subjects a narrow focus detection region is possible, and it is difficult to achieve both of these objectives. Further, for mixed near and far subjects, it is likely that hunting of the focus lens will be brought about.

SUMMARY OF THE INVENTION

The present invention provides a focus adjustment device and a focus adjustment method that can unerringly focus on a subject that the photographer wishes to focus on with a simple method.

A focus adjustment device of a first aspect of the present invention comprises an image sensor that outputs image data by forming a subject image that has been subjected to pupil division by means of a photographing lens that includes a focus lens, and a controller that carries out a focus adjustment operation based on the image data, the controller comprising: a focus detection region setting section that sets a first focus detection region, and a second focus detection region, that is contained in the first focus detection region, and that is narrower than the first focus detection region, a focus calculation section that carries out phase difference detection based on image data of the first focus detection region or the second focus detection region, and respectively calculates first phase difference amount or second phase difference amount, a reliability determination section that determines whether or not reliability of result of the phase difference detection is high, and a control section that carries out a focus adjustment operation based on phase difference amount calculated by the focus calculation section, wherein the control section carries out a focus adjustment operation based on the first phase difference amount in the event that it has been determined that the first phase difference amount is larger than a first threshold value, and then by executing focus detection using the focus calculation section after the focus adjustment operation, in the event that it has been determined that reliability of both the first phase difference amount and the second phase difference amount is high, and that a difference between the two is smaller than a second threshold value, and that it has been determined that the first phase difference amount is smaller than the first threshold value, a focus adjustment operation is carried out based on the second phase difference amount.

A focus adjustment method of a second aspect of the present invention generates image data by forming a subject image that has been subjected to pupil division by means of a photographing lens that includes a focus lens, and carries out a focus adjustment operation based on the image data, the focus adjustment method comprising: in an imaging region, setting a first focus detection region, and a second focus detection region, that is contained in the first focus detection region, and that is narrower than the first focus detection region, carrying out phase difference detection based on image data of the first focus detection region or the second focus detection region, and respectively calculating first phase difference amount or second phase difference amount, determining whether or not reliability of results of the phase difference detection is high, and carrying out a focus adjustment operation based on the first phase difference amount in the event that it has been determined that the first phase difference amount is larger than a first threshold value, and then by executing focus detection using the focus calculation section after the focus adjustment operation, in the event that it has been determined that reliability of both the first phase difference amount and the second phase difference amount is high, and that a difference between the two is smaller than a second threshold value, and that it has been determined that the first phase difference amount is smaller than the first threshold value, a focus adjustment operation is carried out based on the second phase difference amount.

BRIEF DESCRIPTION OF THE DRAWINGS

FIG. 7 is a graph showing correlation operation results, in the camera of one embodiment of the present invention.

FIG. 16 is a drawing showing focus results for each area, at time point n=1 (infinity position) in FIG. 14, in the camera of one embodiment of the present invention.

FIG. 17 is a drawing showing focus results for each area, at time point n=3 (close-up position) in FIG. 14, in the camera of one embodiment of the present invention.

FIG. 21 is a drawing showing focus results for each area, at time point n=3 (close-up position) in FIG. 19, in the camera of one embodiment of the present invention.

FIG. 22 is a drawing showing focus results for each area, at time point n=5 (infinity position) in FIG. 19, in the camera of one embodiment of the present invention.

DETAILED DESCRIPTION OF THE PREFERRED EMBODIMENTS

Figure 1:
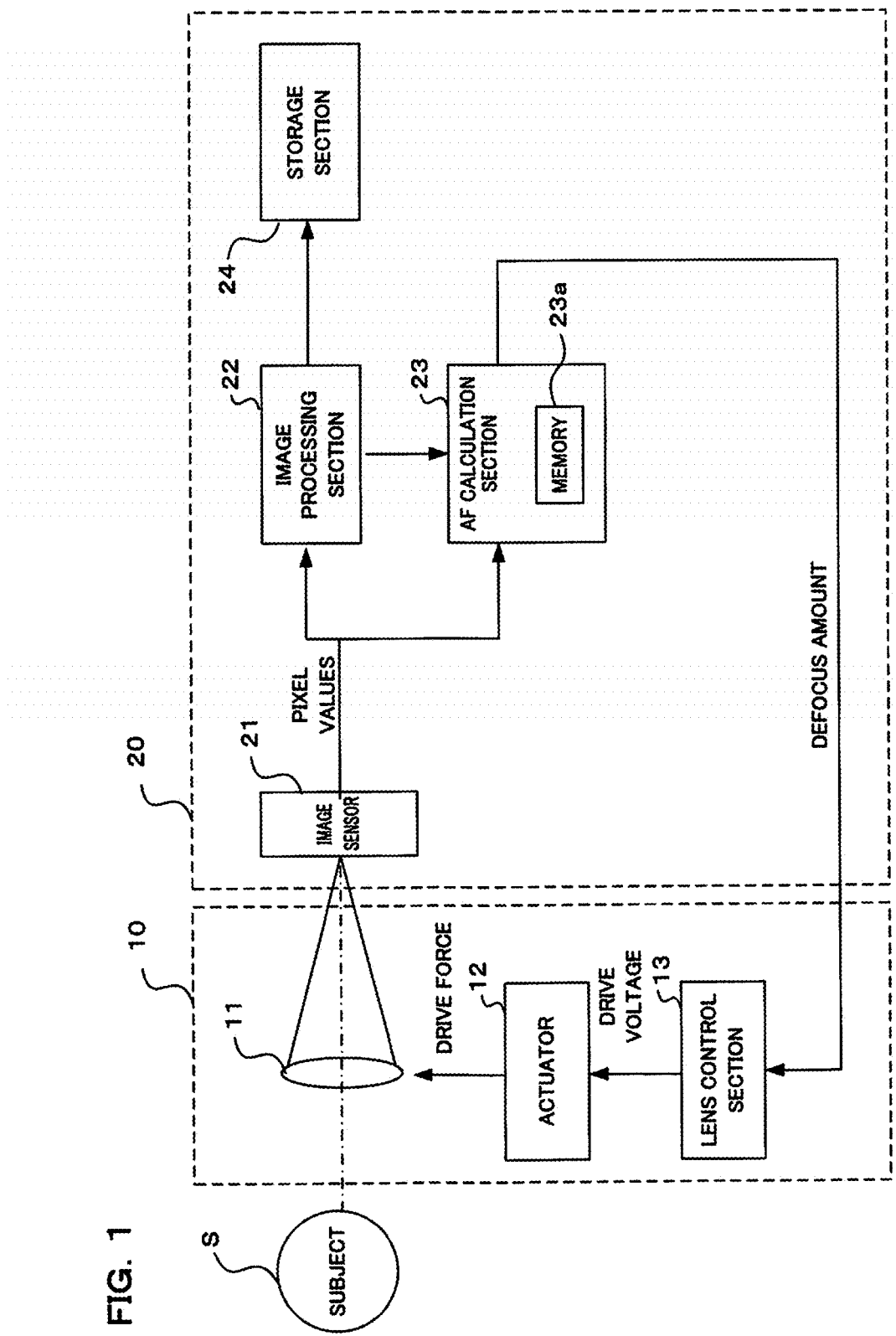
FIG. 1 is a block diagram mainly showing the electrical structure of a camera of one embodiment of the present invention.

A preferred embodiment using a digital camera (hereafter abbreviated to "camera") to which the present invention has been applied will be described in the following in accordance with the drawings. FIG. 1 is a block diagram mainly showing the electrical structure of a camera of one embodiment of the present invention. The camera relating to this embodiment comprises an interchangeable lens barrel 10 and a camera body 20. With this embodiment, the interchangeable lens barrel 10 and a camera body 20 are configured separately, but they may also be constructed integrally, like a general compact camera. Also, the camera of this embodiment receives light of a subject image that has been subjected to pupil division by a photographing lens, that includes a focus lens, subjects the subject image to photoelectric conversion to generate image data, and carries out a focus adjustment operation based on the image data (refer to FIG. 3 to FIG. 7).

A photographing lens 11 is arranged inside the interchangeable lens barrel 10. The photographing lens 11 is constituted by a plurality of optical lenses, including a focus lens for forming an optical image of a subject S. An actuator 12 and a lens control section 13 are also arranged inside the interchangeable lens barrel 10.

A lens control section 13 has a CPU (Central Processing Unit), peripheral circuits and a memory that stores programs etc. The lens control section 13 receives a defocus amount from an AF calculation section 23 inside the camera body 20, and caries out control of the actuator 12 based on these items of information. The actuator 12 moves the focus lens within the photographing lens 11 in the optical axis direction to carry out focusing. It should be noted that position of the focus lens is detected using a lens position detection section (not illustrated), and lens position is transmitted by means of a communication section (not illustrated) to the camera body 20.

An image sensor 21, image processing section 22, AF calculation section 23, and storage section 24 are provided within the camera body 20. The image sensor 21 is arranged on the optical axis of the photographing lens 11, close to a position where a subject image is formed.

The image sensor 21 outputs image data by forming a subject image that has been subjected to pupil division by means of a photographing lens that includes a focus lens. The image sensor 21 is provided with a plurality of pixels that have a photoelectric conversion section for converting the subject image (optical image) to an electrical signal. A plurality of pixels include phase difference AF detection pixels that have been configured such that incident direction of light flux that is incident on the pixels is restricted (hereafter referred to as "focus detection pixels" or "distance measurement pixels"), and imaging pixels that have been configured such that light flux that is incident on the pixels is restricted more than for the phase difference AF detection pixels, and the plurality of pixels are arranged two dimensionally. Arrangement of the phase difference AF detection pixels and the imaging pixels of the image sensor 21 will be described later using FIG. 3 and FIG. 4.

The image sensor 21 outputs pixel values that have been output from the phase difference AF detection pixels and the imaging pixels to the image processing section 22 and the AF calculation section 23. The image processing section 22 has an image processing circuit, is input with pixel values from the imaging pixels, among the pixel values, and carries out image processing for a live view display image and a storage image. The image processing section 22 also outputs image data that has been processed for storage to the storage section 26. The storage section 24 is an electrically rewritable non-volatile memory, to which image data for storage is input and stored. The image processing section 22 also detects a face of a subject using pixel values and outputs a central coordinate position of this face, and detects organs such as eyes of the face and outputs a specified coordinate position of this organ. The image processing section 22 also carries out subject tracking using pixel values.

The AF calculation section 23 has a CPU (Central Processing Unit), peripheral circuits and a memory 23a that stores programs etc. The AF calculation section 23 is input with pixel values from the phase difference AF detection pixels, among pixel values, and carries out AF calculation based on phase difference AF. At the time of AF calculation, the AF calculation section 23 sets a ranging area corresponding to position of the phase difference AF detection pixels based on central coordinate position and specified coordinate position that have been acquired from the image processing section 22, and calculates defocus amount and contrast evaluation value for this ranging area that has been set. The AF calculation section 23 drives the focus lens within the photographing lens 11 to an in focus position based on this defocus amount and contrast evaluation value that have been calculated. Also, in a case where the subject has periodicity, the AF calculation section 23 selects a threshold value for degree of correlation in order to calculate defocus amount so that it is possible to drive to a true in focus position.

The AF calculation section 23 functions as a controller that carries out a focus adjustment operation based on image data. The AF calculation section 23 as a controller functions as a control section that carries out a focus adjustment operation based on phase difference detection results of a focus calculation section (refer, for example, to S37 in FIG. 23B). This controller also carries out a focus adjustment operation based on a first phase difference amount in a case where it has been determined that the first phase difference amount is larger than a first threshold value (for example, S5 Yes→S7 Yes→S9 No in FIG. 23A), and carries out a focus adjustment operation based on second phase difference amount when focus detection is executed by the focus calculation section after a focus adjustment operation, reliability of both the first phase difference amount and a second phase difference amount is high, and it has been determined that a difference between the first phase difference amount and the second phase difference amount is smaller than a second threshold value, and it has been determined that the first phase difference amount is smaller than the first threshold value (refer, for example, to FIG. 14 to FIG. 17, and S1 to S11 in FIG. 23A). It should be noted that phase difference amount is also described as image deviation amount.

Also, the control section makes a maximum value, among a plurality of first phase difference amounts output from the focus calculation section for a plurality of first focus detection regions, the first phase difference amount (refer, for example, to area x11 in FIG. 16). It should be noted that the maximum value, among phase difference values, becomes larger as the close-up end is approached.

Figure 23A:
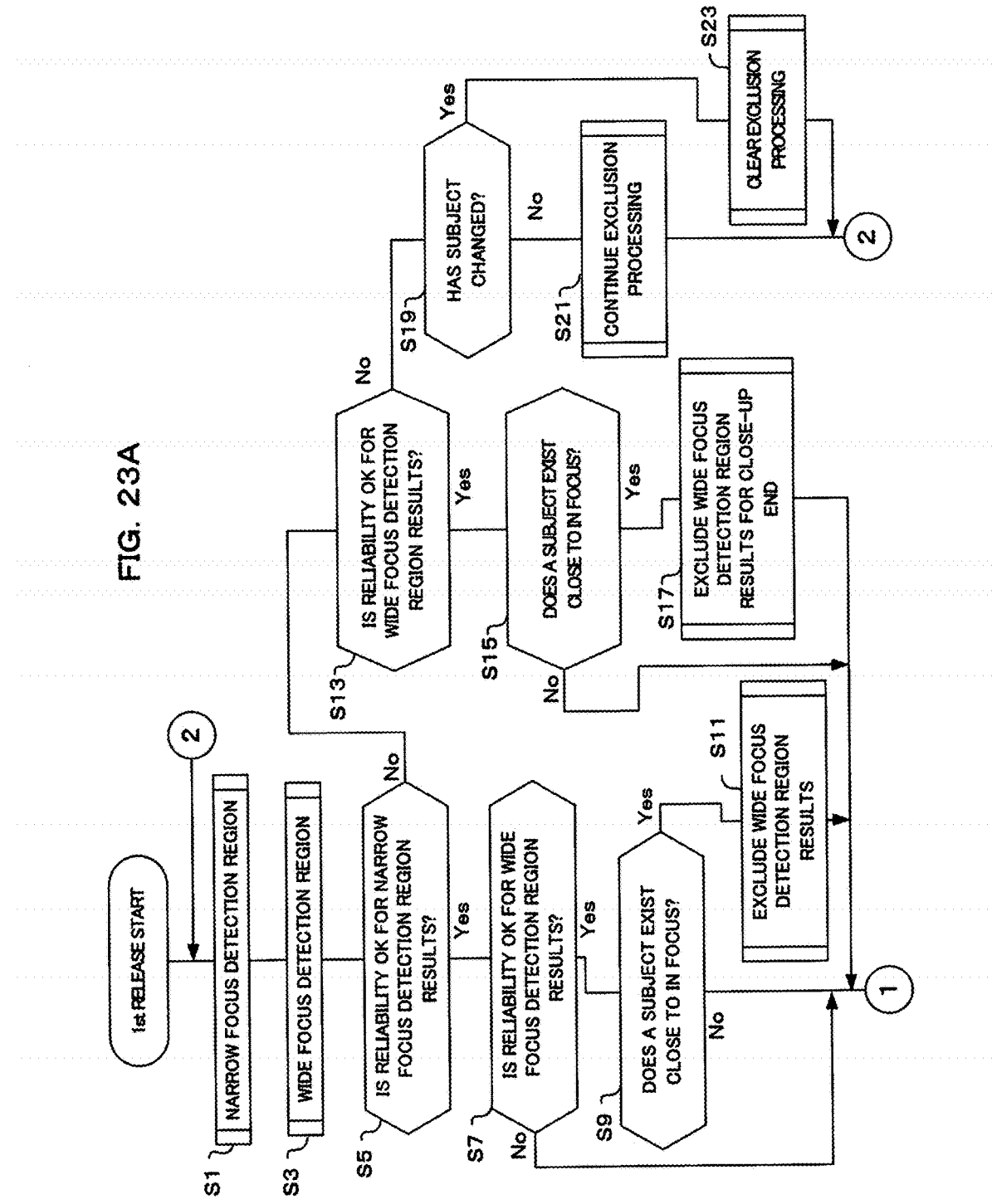
FIG. 23A and FIG. 23B are flowcharts showing operation of the camera of one embodiment of the present invention.

Also, the control section carries out a focus adjustment operation based on the first phase difference amount corresponding to maximum value in a case where it has been determined that a maximum value, among absolute values of a plurality of first phase difference amounts, is larger than the first threshold value, and then by executing focus detection by the focus calculation section after the focus adjustment operation, if it has been determined that a maximum value among absolute values of a plurality of first phase difference amounts is smaller than the first threshold value, and that reliability of all of the plurality of second phase difference amounts is not high, a focus adjustment operation is carried out based on a phase difference amount that represents negative value, among a plurality of first phase difference amounts (refer, for example, to FIG. 19 to FIG. 22, and S13 Yes→S15 Yes→S17 in FIG. 23A).

Also, the AF calculation section 23, acting as a controller, functions as an angle of view change determination section that determines change of shooting angle of view. In a case where the interchangeable lens barrel 10 includes a variable power optical system, the AF calculation section 23 is input with focal length information that changes in accordance with operation of a focal length change member, such as a zoom ring provided on the interchangeable lens barrel 10, from the lens control section 13. The AF calculation section 23 is also input with detection signals from a sensor (functioning as an attitude detection sensor) that detects attitude of the camera body 20, such as a gyro or acceleration sensor.

Also, the previously described angle of view change determination section determines change in shooting angle of view based on change in focal length of the variable power optical system. The angle of view change determination section determines change in shooting angle of view based on output of an attitude detection section.

Also, the previously described control section continues the focus adjustment operation based on phase difference amount representing a negative value, among a plurality of first phase difference amounts, until it is determined by the angle of view change determination section that angle of view of the shooting region has changed (refer, for example, to S19 to S23 in FIG. 23A). Positive value of phase difference amount means of value towards the close up end, while a negative value means a value towards the infinity end.

Figure 2:
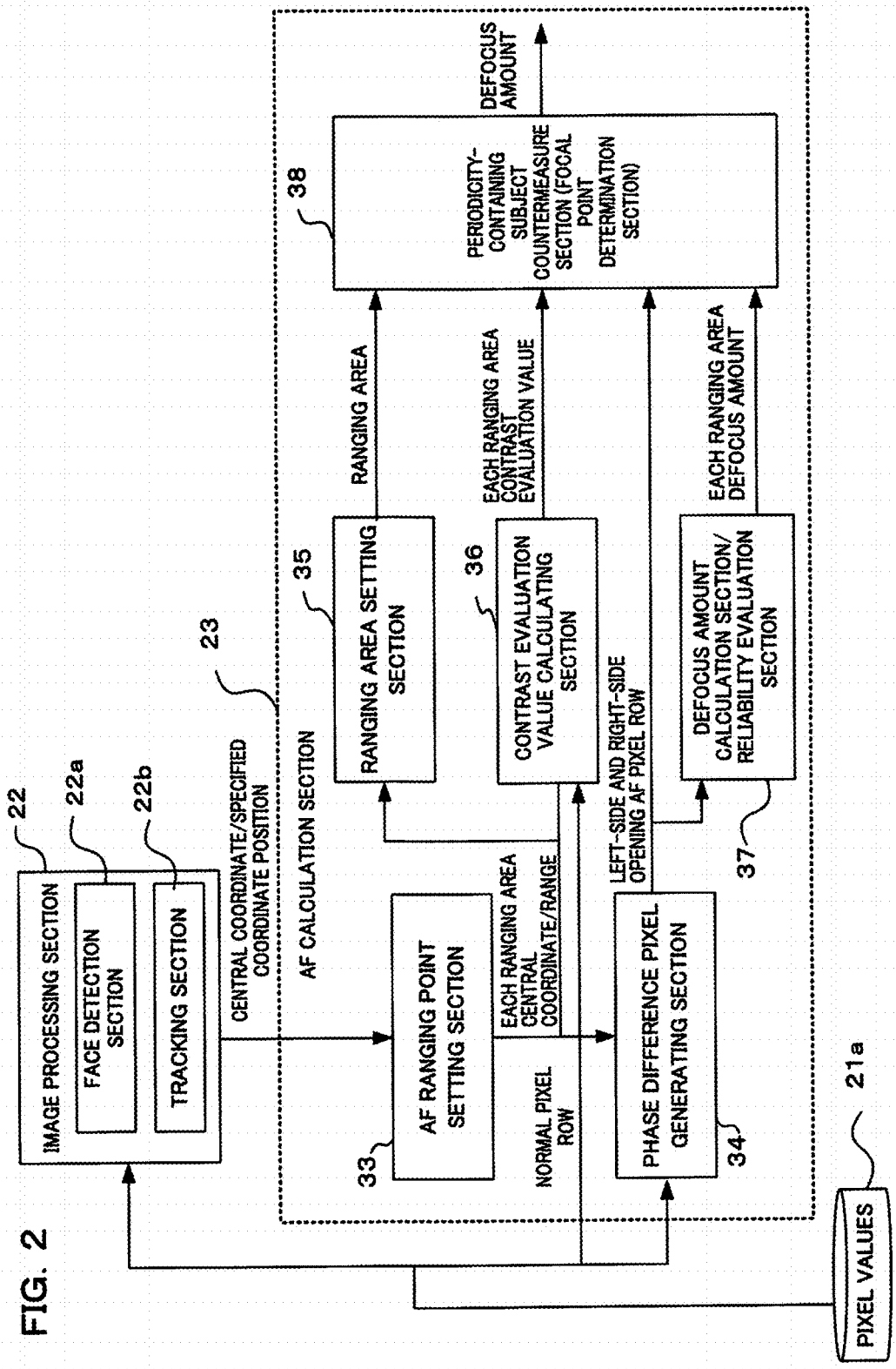
FIG. 2 is a block diagram showing detail of an AF calculation section of a camera of one embodiment of the present invention.

Next, details of the AF calculation section 23 will be described using FIG. 2. Pixel values 21a are pixel values that have been output from the image sensor 21, and are temporarily stored in SDRAM or the like (not illustrated).

A face detection section 22a, having a face detection circuit, is also provided within the image processing section 22. This face detection section 22a determines whether or not there is a face within the subject image based on pixel values of imaging pixels from the image sensor 21, and if a face is contained in the subject image detects the position (central coordinate position) and size of that face. Detection of organs such as the right ear, left ear, nose etc. is also carried out, and specified coordinate position of those organs is also detected. Central coordinates and specified coordinate positions that have been detected by the face detection section 22a are output to a ranging point setting section 33 within the AF calculation section 23.

A tracking section 22b having a tracking circuit is also provided within the image processing section 22. This tracking section 22b carries out tracking of a subject based on pixel values of imaging pixels from the image sensor 21. For example, for position of a face that has been detected by the face detection section 22a or position of a subject that has been designated by the photographer, every time pixel values output from the image sensor 21 it is detected where the same subject has moved to by comparing pixel values, and tracking is carried out using this detected movement. Central coordinate and specified coordinate positions within a tracked object that has been detected by the tracking section 22b are output to an AF ranging point setting section 33 within the AF calculation section 23.

The AF ranging point setting section 33 sets ranging point corresponding to central coordinate position and specified coordinate position based on central coordinate position and specified coordinate position that have been detected by the face detection section 22a or the tracking section 22b. The image sensor 21 is divided into a plurality of ranging points, ranging points that are close to the central coordinate position and specified coordinate position are set from among the plurality of ranging points, and a central coordinate of each ranging point that has been set is output to a ranging area setting section 35 and a contrast evaluation value calculation section 36. It should be noted that ranging points can also be set manually by the user.

A phase difference pixel generating section 34 is input with image data of phase difference AF detection pixels, within the pixel values 21a, and generates a pixel row for phase difference AF detection, outputting this pixel row to a defocus amount calculating section/reliability evaluation section 37 and a periodicity-containing subject countermeasure section 38 (also called ranging point determination section).

The defocus amount calculating section/reliability evaluation section 37 is input with image data of the pixel line for phase difference AF detection, calculates a defocus amount using a phase difference AF method, and outputs a defocus amount for each ranging area to the periodicity-containing subject countermeasure section 38. The defocus amount calculating section/reliability evaluation section 37 functions as a phase difference detection section that detects extreme values having a high degree of correlation based on image data. The calculation of defocus amount and the determination of reliability using phase difference AF will be described later using FIG. 5 to FIG. 7.

The defocus amount calculating section/reliability evaluation section 37 functions as a focus calculation section that carries out phase difference detection based on image data of the first focus detection region or the second focus detection region, and calculates first phase difference amount or second phase difference amount. The defocus amount calculating section/reliability evaluation section 37 also functions as a reliability determination section that determines whether or not reliability of results of phase difference detection is high.

The ranging area setting section 35 is input with central coordinates of each ranging area from the AF ranging point setting section 33, sets ranging areas, and outputs the set ranging areas to the periodicity-containing subject countermeasure section 38. The ranging area setting section 35 functions as a focus detection region setting section that sets a first focus detection region and a plurality of second focus detection regions, that are contained in the first focus detection region and are narrower than the first focus detection region, in an imaging region, based on the ranging areas that have been set (refer, for example, to the wide focus detection region x11 and the narrow focus detection regions x12 to x14 in FIG. 9, and S1 and S3 in FIG. 23A). This focus detection region setting section has a plurality of first focus detection regions (for example, the plurality of regions x11, x21, and x31 in FIG. 13).

The contrast evaluation value calculation section 36 is input with pixel values from imaging pixels from the pixel values 21a, and is also input with central coordinates of each ranging area from the AF ranging point setting section 33. Calculation of contrast evaluation value is carried out using this information, and contrast evaluation value for each ranging area is output to the periodicity-containing subject countermeasure section 38. Since this contrast evaluation value is calculated using pixel values from the imaging pixels, a longer calculation time is required but it is possible to obtain contrast value of higher precision.

The periodicity-containing subject countermeasure section 38 is input with ranging areas, a contrast evaluation value for each ranging area, defocus amount of each ranging area, and left and right-side opening AF pixel rows, as was described previously, and calculates defocus amount for the ranging areas that have been set so that an appropriate focus point is required even for a periodicity-containing subject. The periodicity-containing subject countermeasure section 38 functions as a periodicity-containing subject determination section that determines a periodicity-containing subject when a plurality of extremely high degrees of correlation are detected by the phase difference detection section. Determination as to whether or not there is a periodicity-containing subject will be described later using FIG. 8A and FIG. 8B.

Figure 3:
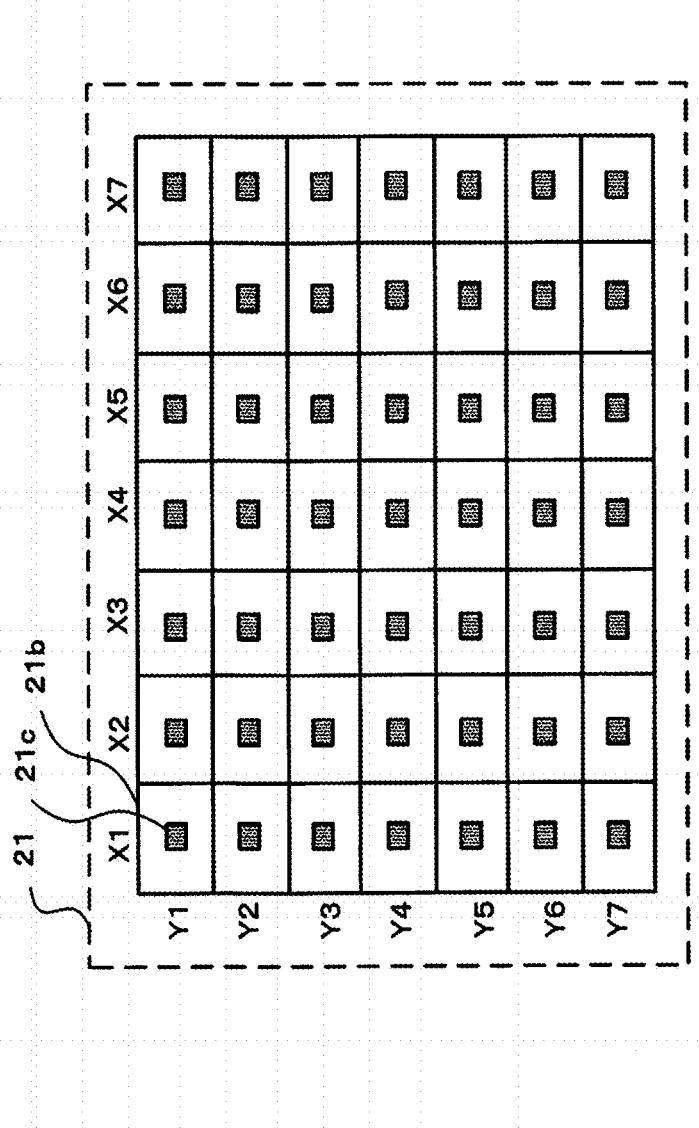
FIG. 3 is a diagram showing arrangement of pixels of an image sensor of a camera of one embodiment of the present invention, the pixels being made up of phase difference AF detection pixels and imaging pixels.

Next, the image sensor 21 and the ranging areas will be described using FIG. 3 and FIG. 4. With the example shown in FIG. 3, the image sensor 21 is divided in the column direction into X1-X7 and in the row direction into Y1-Y7, and each of these 49 areas constitutes a ranging area. The area shown by reference numeral 21b is represented as (X1, Y1). A center point 21c of each ranging area of each area is made a center coordinate of the ranging area.

Figure 4:
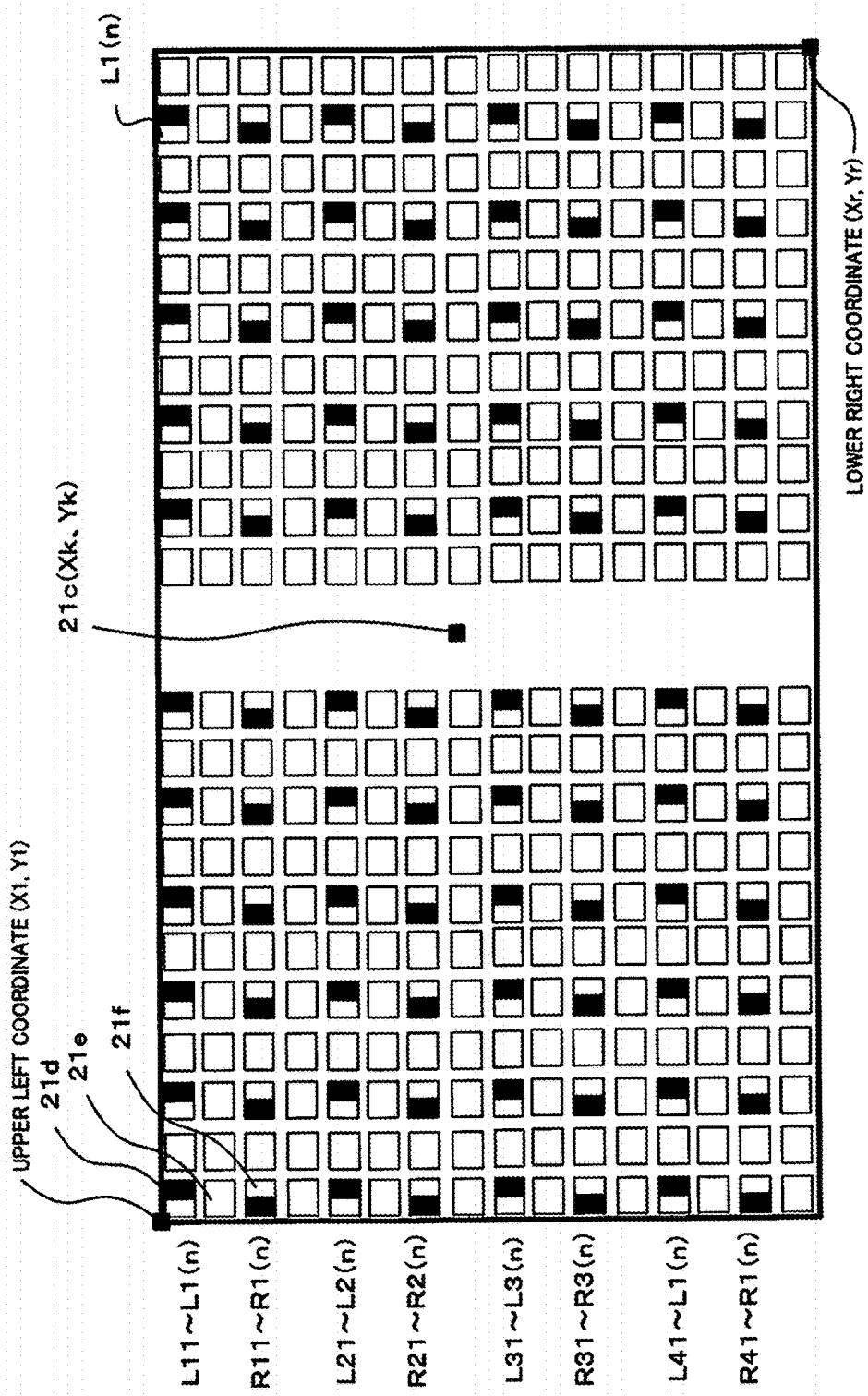
FIG. 4 is an enlarged diagram of one ranging area of an image sensor of a camera of one embodiment of the present invention.

FIG. 4 shows an arrangement example of pixels of a single ranging area. The inside of each ranging area show in FIG. 3 is made up of phase difference AF detection pixels and imaging pixels, as shown in FIG. 4. In FIG. 4 a rectangle represents a single pixel. Pixels that have the left side or right side of the rectangle filled in black are phase difference AF detection pixels, while pixels that do not have any parts within the rectangle filled are imaging pixels.

Within the ranging areas shown in FIG. 4, left-side opening phase difference AF detection pixels 21d, imaging pixels 21e and right-side opening phase difference AF pixels 21f are arranged alternately. Typically, with the column furthest to the left, L11, L21, L31 and L41 are left-side opening phase difference AF pixels 21d, R11, R21, R31 and R41 are right-side opening phase difference AF pixels 21f, and imaging pixels 21e are arranged between these phase difference AF pixels. The second column in from the left has only imaging pixels 21e. After that, columns containing phase difference AF detection pixels and columns made up of only imaging pixels are repeatedly arranged alternately.

It should be noted that with this embodiment, columns that include phase difference AF detection pixels and columns that are made up of only imaging pixels are alternatively arranged on every other column, but it is also possible to have two or more columns that are made up of only imaging pixels between one column that includes phase difference AF detection pixels and another column that includes phase difference AF detection pixels.

An AF pixel column generated by the phase difference pixel generating section 34 (refer to FIG. 2) is subjected to calculation for an average value of pixel values from the left-side opening AF detection pixels or an average value of pixel values from the right-side opening AF detection pixels. With this embodiment, since each pixel row is made up of four pixels, this is achieved by adding for each pixel column and dividing by 4. Specifically, average values are derived using the following calculations.

Left-side opening AF detection pixel row:

$$L1 = (L11 + L21 + L31 + L41)/4$$
$$L2 = (L12 + L22 + L32 + L42)/4$$
$$L3 = (L13 + L23 + L33 + L43)/4$$
$$...$$
$$Ln = (L1(n) + L2(n) + L3(n) + L4(n))/4$$

Right-side opening AF detection pixel row:

$$R1 = (R11 + R21 + R31 + R41)/4$$
$$R2 = (R12 + R22 + R32 + R42)/4$$
$$R3 = (R13 + R23 + R33 + R43)/4$$
$$...$$
$$Rn = (R1(n) + R2(n) + R3(n) + R4(n))/4$$

Also, with the example shown in FIG. 4, an upper left coordinate is (X1, Y1), a lower right coordinate is (Xr, Yr), and a center coordinate 21c of the ranging area is (Xk, Yk). The center coordinates (Xc[k], Yc[k]) of the ranging area constitute a position where an arbitrary length (a[k], b[k]) (with this embodiment k=1 to 7) has been added to a face center coordinate/specified coordinate (Xco, Yco), for every respective ranging area, and so become $$Xc[k]=Xco+a[k], Yc[k]=Yco+b[k].$$

It should be noted that k is a number of the ranging area, and k=0, 1, 2, . . . , Area_num−1 (Area_num: number of ranging areas) are set.

Figure 5:
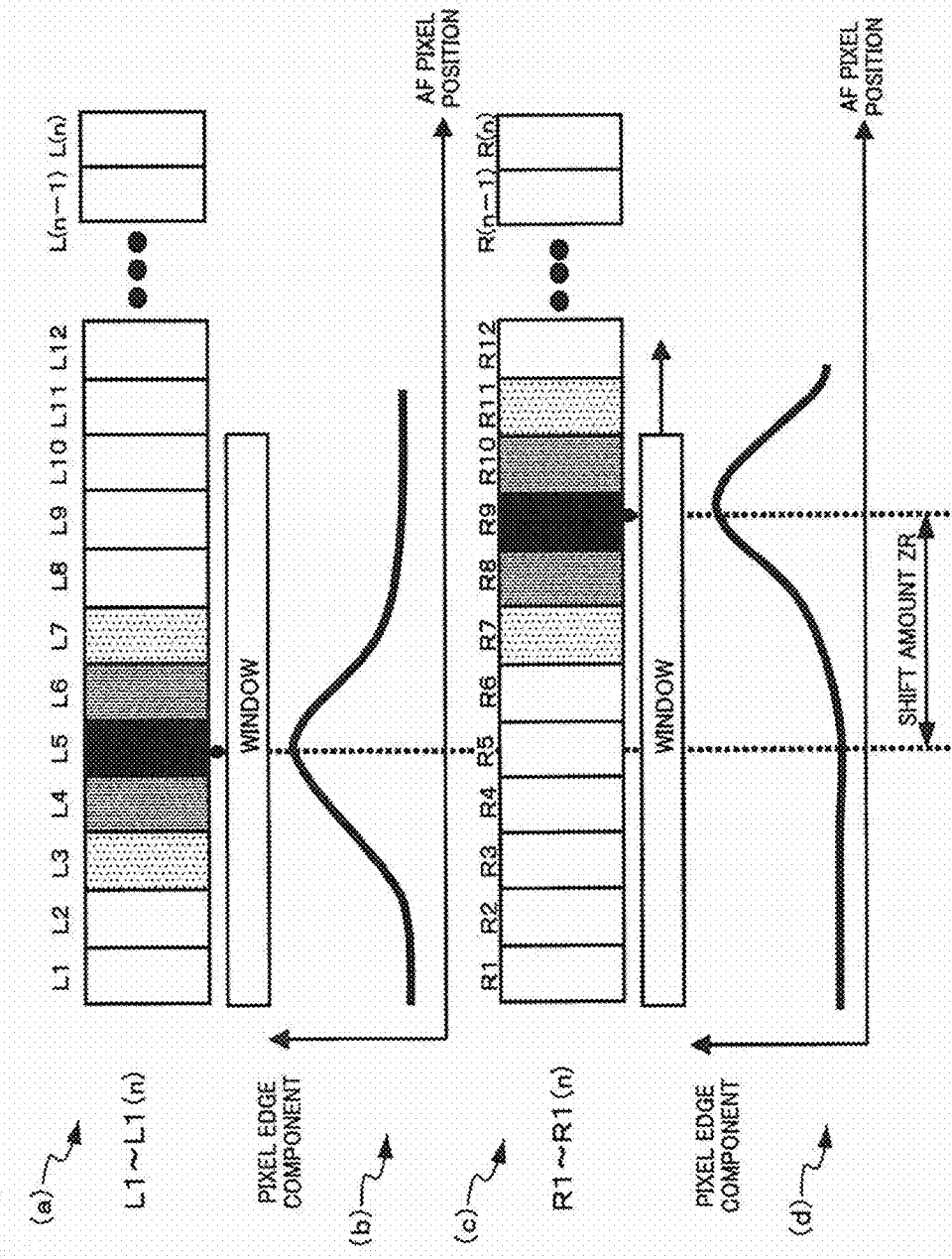
FIG. 5 is a diagram for explaining a distance measurement method in a camera of one embodiment of the present invention.
Figure 6:
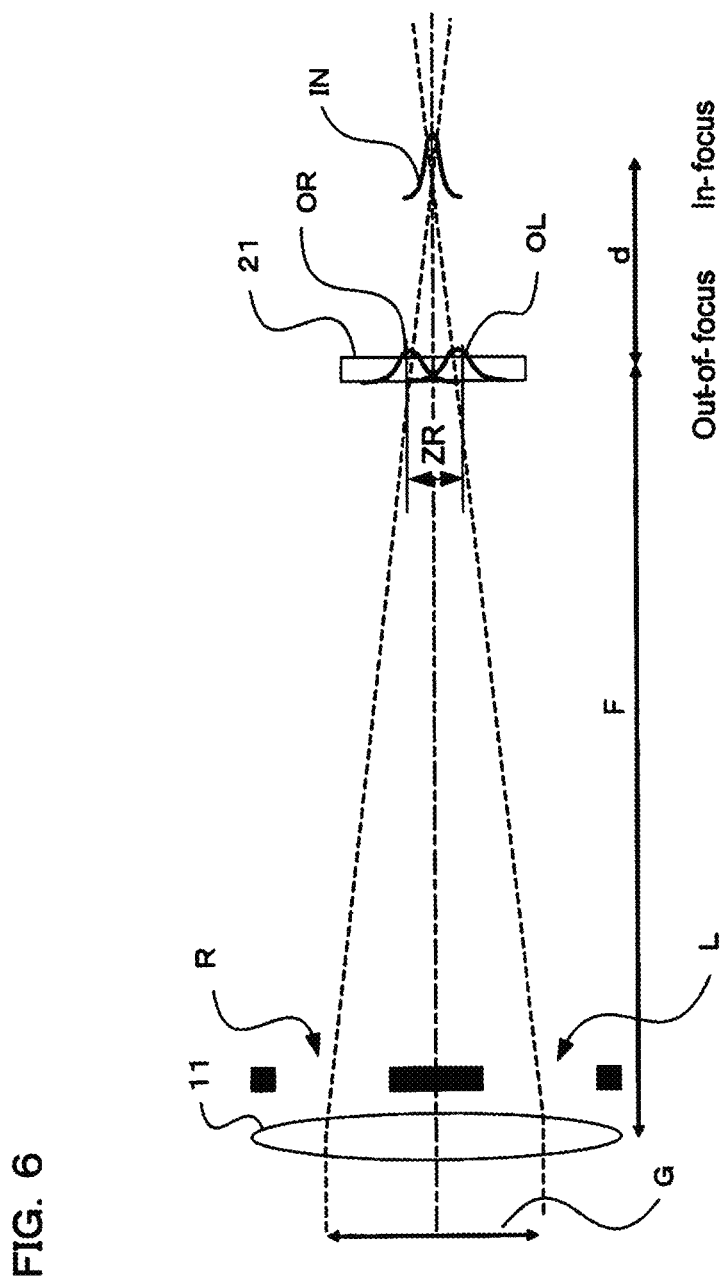
FIG. 6 is a diagram for explaining a distance measurement method in a camera of one embodiment of the present invention.

The defocus amount calculating section/reliability evaluation section 37 adds and subtracts (c[k], d[k]) from center of a ranging area (Xc[k], Yc[k]) (c[k], d[k] are predetermined numerical values for every area, and x and y direction ranges for correlation calculation), defines upper left coordinates (X1[k], Y1[k])=(Xc[k]−c[k], Yc[k]−d[k]) and lower right coordinates (Xr[k], Yr[k]=(Xc[k]+c[k], Yc[k]+d[k]), and within that range carries out calculation to obtain defocus amount based on phase difference AF that will be explained using FIG. 5 to FIG. 7.

FIG. 6 is a drawing showing ranging principle for phase difference AF. Right-side openings R and left-side openings L are provided within the light flux of the photographing lens 11, an image OR that is equivalent to pixel output based on light flux of only the right-side openings R on the image sensor 21 is compared with an image OL that is equivalent to pixel output based on light flux of only the left-side openings L on the image sensor, and in the event that focus is not achieved both images OR and OL are displaced by a shift amount ZR. Also, at an in focus position that is defocus amount d away, both images IN coincide. Accordingly, shift amount ZR is obtained, defocus amount d is obtained based on shift amount ZR, and the photographing lens 11 may be moved to an in focus position based on defocus amount d. It should be noted that reference numeral G in FIG. 6 shows distance between centroids of left-side and right-side openings, and reference numeral F represents distance from an image plane to a pupil.

The upper part (a) and the part second from the top (b) in FIG. 5 show pixel values (pixel edge components) corresponding to arrangement position of left-side opening phase difference AF detection pixel columns L1-L (n) (equivalent to image OL in FIG. 6). Also, the third level (c) and the fourth level (d) of FIG. 5 show pixel values (pixel edge components) corresponding to arrangement position of right-side opening phase difference AF detection pixel columns R1-R(n) (equivalent to image OR in FIG. 6). These pixel values are used to obtain degree of correlation of subjects that have been taken on left-side and right-side opening pixel columns. Difference between phase difference AF detection pixel positions where shape of a subject image is extremely similar constitutes shift amount (parallax error) ZR.

Regarding shift amount, for example, a window that corresponds to a left-side opening pixel column is fixed, a window corresponding to a right-side opening pixel column is moved one pixel at a time, then, if movement for the window corresponding to the right-side opening pixel column has been completed, a window corresponding to a right-side opening pixel column is fixed and a window corresponding to a left-side opening pixel column is moved one pixel at a time. An evaluation value Fm is obtained from a cumulative value for difference between left-side opening phase difference AF detection pixel values and right-side opening phase difference AF detection pixels value within a window at this time. A shift amount when this evaluation value Fm becomes a minimum value is shift amount ZR.

FIG. 7 is a graph showing position and Fm of phase difference AF detection pixels close to where evaluation value Fm becomes a minimum value. In this graph, where position of the phase difference AF detection pixels is min, evaluation value Fm becomes a minimum. Here, since evaluation value Fm is discrete data, interpolation processing is carried out using a plurality of items of evaluation value Fm in the vicinity of the minimum value, and a true minimum value is obtained to calculate shift amount ZR.

Once shift amount ZR has been obtained, defocus amount d can be calculated from shift amount ZR using equation (1) below. Specifically, from the relationship that was shown in FIG. 6, $$G:ZR=F+d:d$$

$$(F+d)*ZR-dG=0$$

$$d=F*ZR/(G-ZR) \quad (1)$$

Here, d: defocus amount
F: distance from image sensor to pupil
ZR: shift amount
G: distance between centroids of left-side and right-side openings The defocus amount calculating section/reliability evaluation section 37 uses degree of correlation inclination Fs of the evaluation value Fm as a phase difference AF reliability value. Specifically, with the example showing in FIG. 7, inclination Fs[k] of a straight line that passes through a minimum value of evaluation value Fm (FMIN) and the larger evaluation value FM of two items of Fm before and after this minimum value is calculated as an evaluation value representing reliability, and output. A minimum value ans1 that has been interpolated by approximation at inclination Fs[k] represents a shift amount (image deviation amount) at which correlation between two images of the left-side opening and the right-side opening become highest, and this value is made a two image intermediate value. By substituting shift amount ans1 for ZR in equation (1) above, defocus amount d is calculated.

Figure 8A:
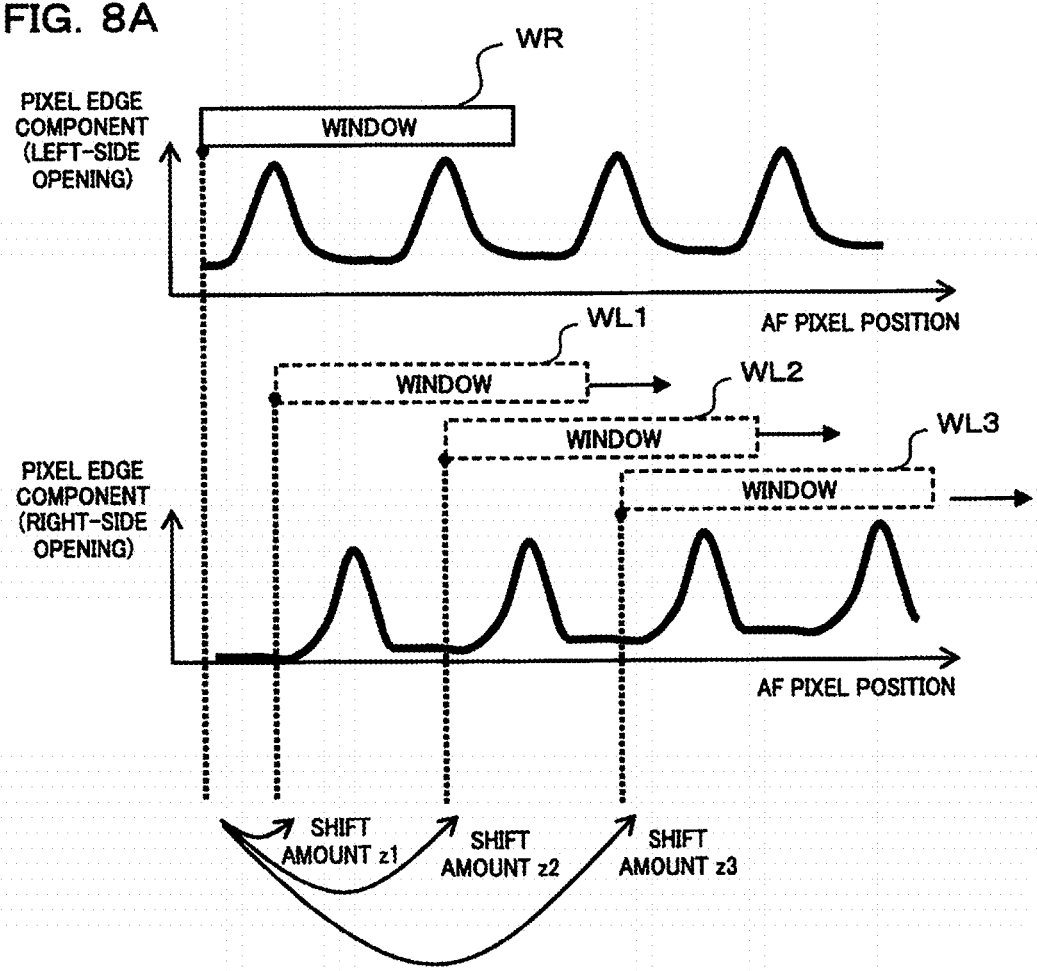
FIG. 8A and FIG. 8B are drawings showing a correlation operation method, and correlation operation results, in a case of distance measurement of a periodicity-containing subject in the camera of one embodiment of the present invention.

Next, a case where a periodicity-containing subject has been ranged using a phase difference AF method will be described using FIG. 8A and FIG. 8B. FIG. 8A shows one example of pixel edge components (pixel output) of a periodicity-containing subject. In FIG. 8A, the upper graph has AF pixel position on the horizontal axis and shows change in pixel edge components of a left-side opening AF pixel column on the vertical axis. Also, the lower graph has AF pixel position on the horizontal axis and shows change in pixel edge components of a right-side opening AF pixel column on the vertical axis.

Since there is a periodicity-containing subject, the right-side open AF pixel column and the left-side open pixel column both have pixel edge components of the same periodic pattern. Therefore, as shown in FIG. 8A, a window WR for the left-side open AF pixel row is fixed, and if correlation calculation is carried out with window WL1 for the right-side open AF pixel row a shift amount becomes z1, carrying out correlation calculation with window WL2 gives a shift amount of z2, and carrying out correlation calculation with window WL3 gives a shift amount z3.

Figure 8B:
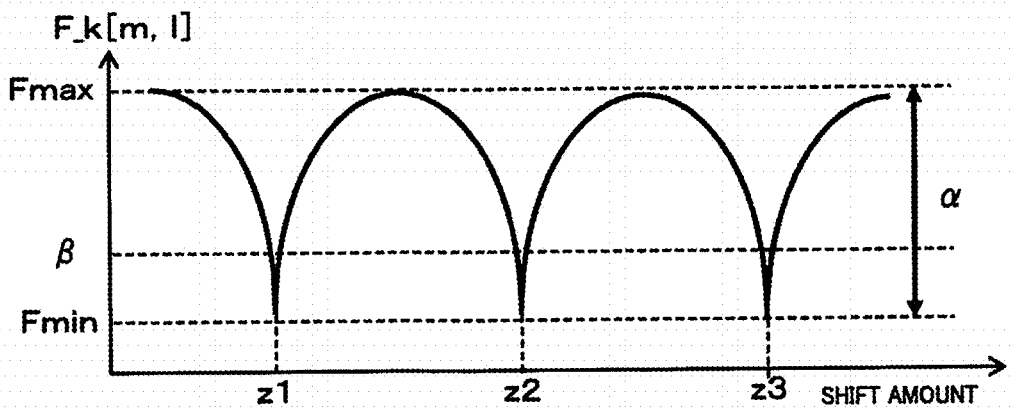

As shown in FIG. 8A, if shift amount is obtained while sequentially moving from window WL1-WL3, then shift amount becomes a minimum value in the order shift amount z1, z2, z3, as shown in FIG. 8B. If a plurality of minimum values are detected in this way, it is not possible to determine which is a true minimum value (specifically, a shift amount corresponding to a true focus point), and phase difference AF method ranging becomes difficult. With this embodiment, therefore, in the case where it has been detected that there is a periodicity-containing subject, an algorithm is executed in order to find a true minimum value. It is therefore first detected whether or not there is a periodicity-containing subject.

A detection method for a periodicity-containing subject of this embodiment is carried out based on the following three points (A1)-(A3).

(A1) Total number of minimum values of evaluation value representing degree of correlation (is 2 or more)
A2) Difference between maximum value Fmax and the minimum value Fmin for evaluation value representing degree of correlation is threshold value α or greater
Minimum value for evaluation value representing degree of correlation is less than threshold value β

With this embodiment, a periodicity-containing subject is determined in the event that all of the above conditions (A1)-(A3) have been satisfied, but it is also possible to omit some of these conditions, or to add other conditions. Also, the threshold values α and β may be fixed values that have been designated in advance, or may be designated externally, or may be capable of being changed depending on other factors.

Next, focus adjustment in a case where subjects exist at a telephoto end and at a close up end (a case of far and near mixing) will be described using FIG. 9 to FIG. 23B.

Figure 9:
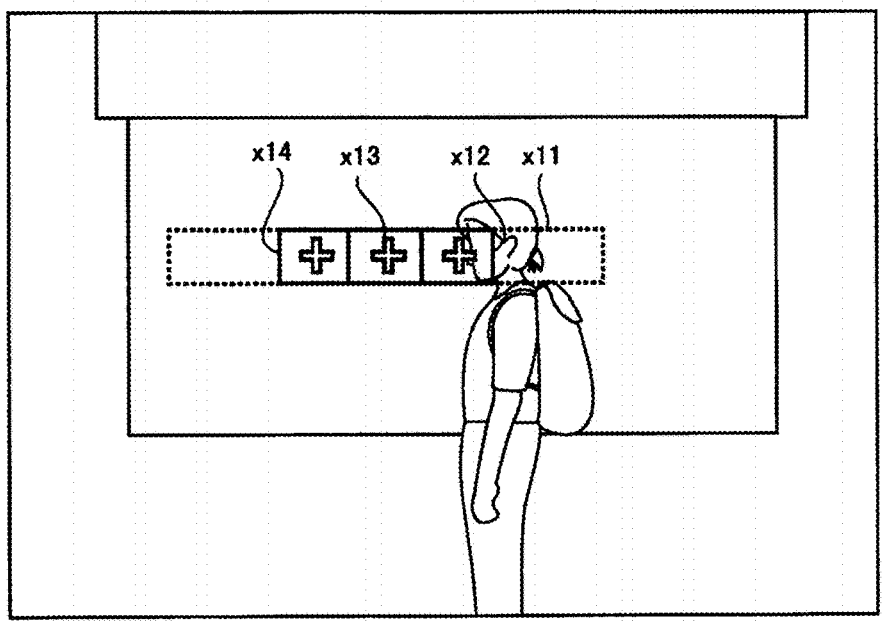
FIG. 9 is a drawing showing one example of a relationship between a subject and distance measurement frames, in the camera of one embodiment of the present invention.

FIG. 9 shows one example of a case where subjects respectively exist both far and near. In FIG. 9, area x11 is a wide focus detection region, and areas x12 to x14 are narrow focus detection regions that have been set within the area x11. With this embodiment the areas x12 to x14 have been arranged displaced so that they do not overlap. It should be noted that with this embodiment, there are three narrow focus detection regions, x12 to x14, but this is not limiting and as appropriate there may be more or less than three regions.

With this embodiment, after a release button has been half-pressed (pressing down of the 1st release), image deviation amount, which is a focus detection result, is constantly calculated for every region (area x11 to area x14), and the reliability of this image deviation amount is determined. It should be noted that degree of correlation is calculated while shifting pixel position, and image deviation amount corresponds to pixel position shift amount (phase difference amount) when this degree of correlation has a minimum value (maximum value). Further, shift amount may be converted to defocus amount, and this defocus amount made image deviation amount. There may also be cases where image deviation amount it is referred to as phase difference amount.

Since the focus detection region of area x11 has a wide detection range, it is possible to calculate image deviation amount even in a significantly defocused state. However, since the number of ranging pixels within the area x11 is large, in order to speed up calculation processing, calculation of image deviation amount is based on an image signal resulting from averaging after adding four pixels, as shown in FIG. 10.

Figure 10:
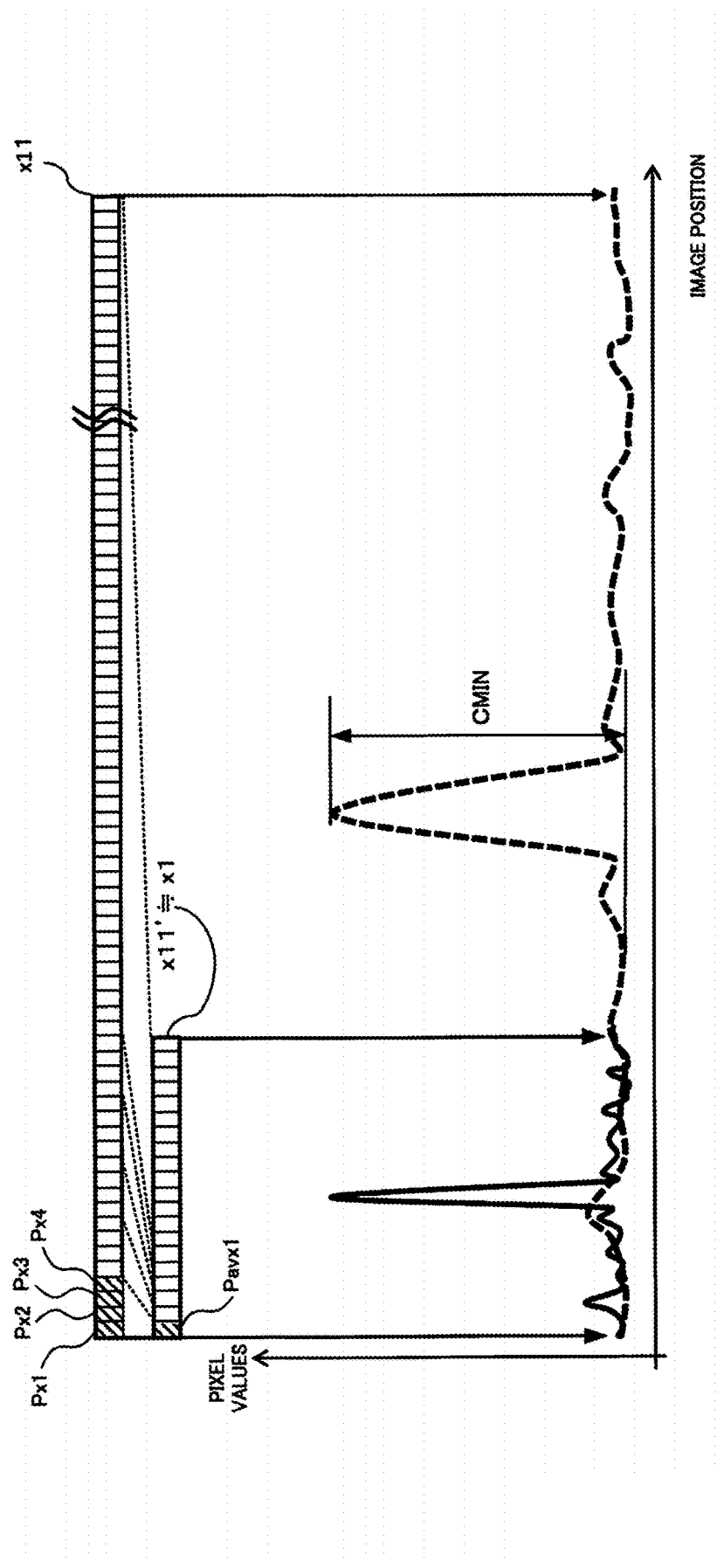
FIG. 10 is a graph showing an image signal for a wide focus detection region (x11), in the camera of one embodiment of the present invention.

With FIG. 10, pixel values of pixels Px1 to Px4 are added, and are then replaced with pixel Pavx1 that has been averaged. As a result of this processing, the number of pixel values (pixels) is reduced to ¼, and as a result of this pixel values (pixels) that are subjected to calculation processing are reduced, and so calculation processing is speeded up. However, errors are contained as a result of averaging pixel values over the four pixels, and focus detection precision becomes bad.

Figure 11:
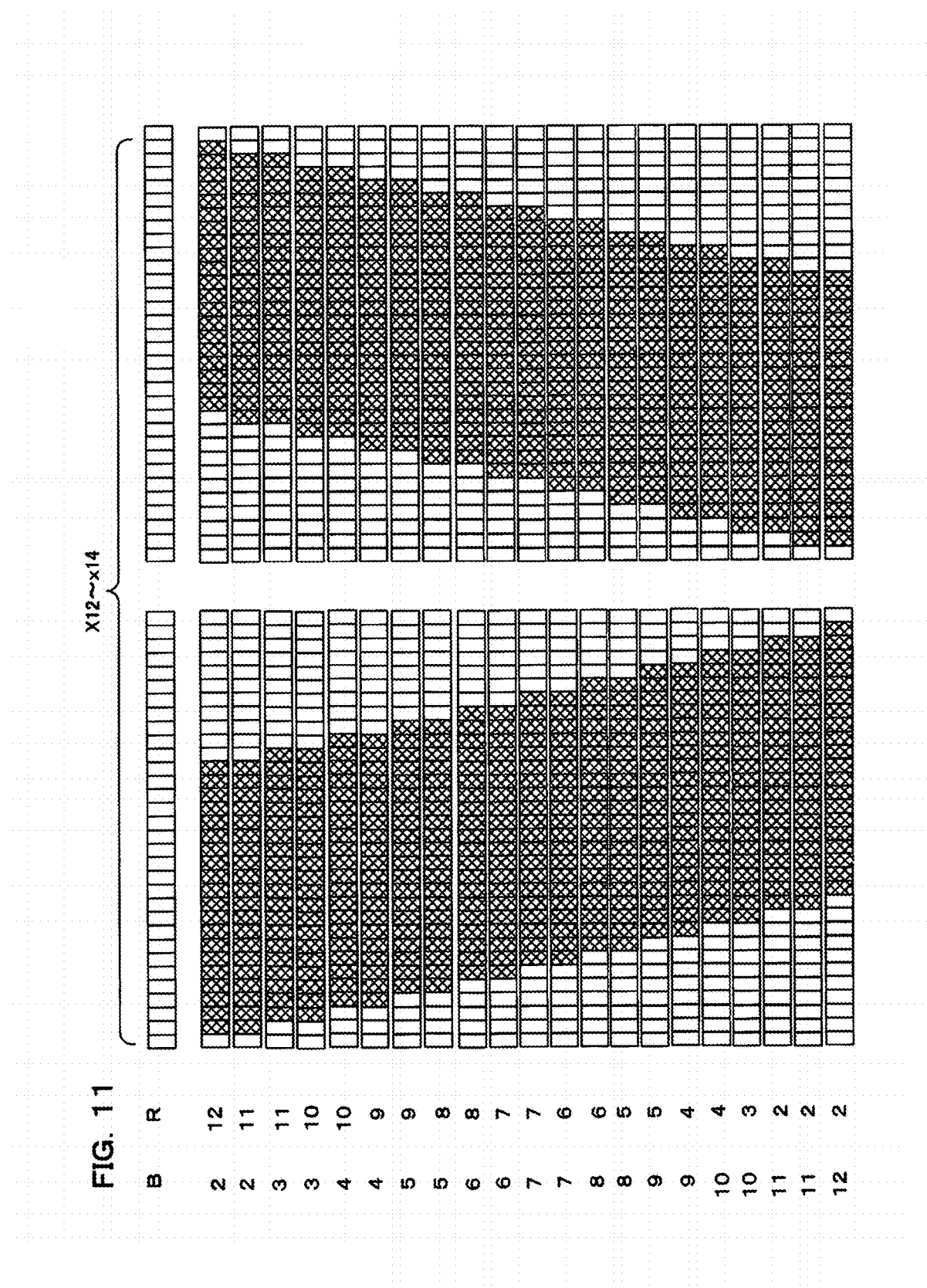
FIG. 11 is a drawing showing image deviation amount calculation for a narrow focus detection region (x12), in the camera of one embodiment of the present invention.

Also, since the focus detection regions of areas x12 to x14 are narrow, it is not possible to calculate image deviation amount in a significantly defocused state. However, with correlation calculation that calculates image deviation amount such as shown in FIG. 11, since degree of correlation is detected by shifting calculation position for every one pixel, focus detection accuracy is good. It should be noted that in FIG. 11, one column on the left side and one column on the right side in the uppermost line of the drawing respectively correspond to pixel columns, and meshed portions in each line show pixels where correlation calculation is carried out. It should also be noted that degree of correlation is calculated from the following equation.

$$\text{degree of correlation} = \Sigma |B\ \text{pixel}(i) - R\ \text{pixel}(i)|$$

In this way, with this embodiment, for the wide focus detection region of area x11, and the plurality of focus detection regions of the narrow focus detection regions of areas x12 to x14, it is possible to detect image deviation amount for every respective region. For this plurality of image deviation amounts, it is determined whether or not selection is possible using reliability determination.

Figure 12:
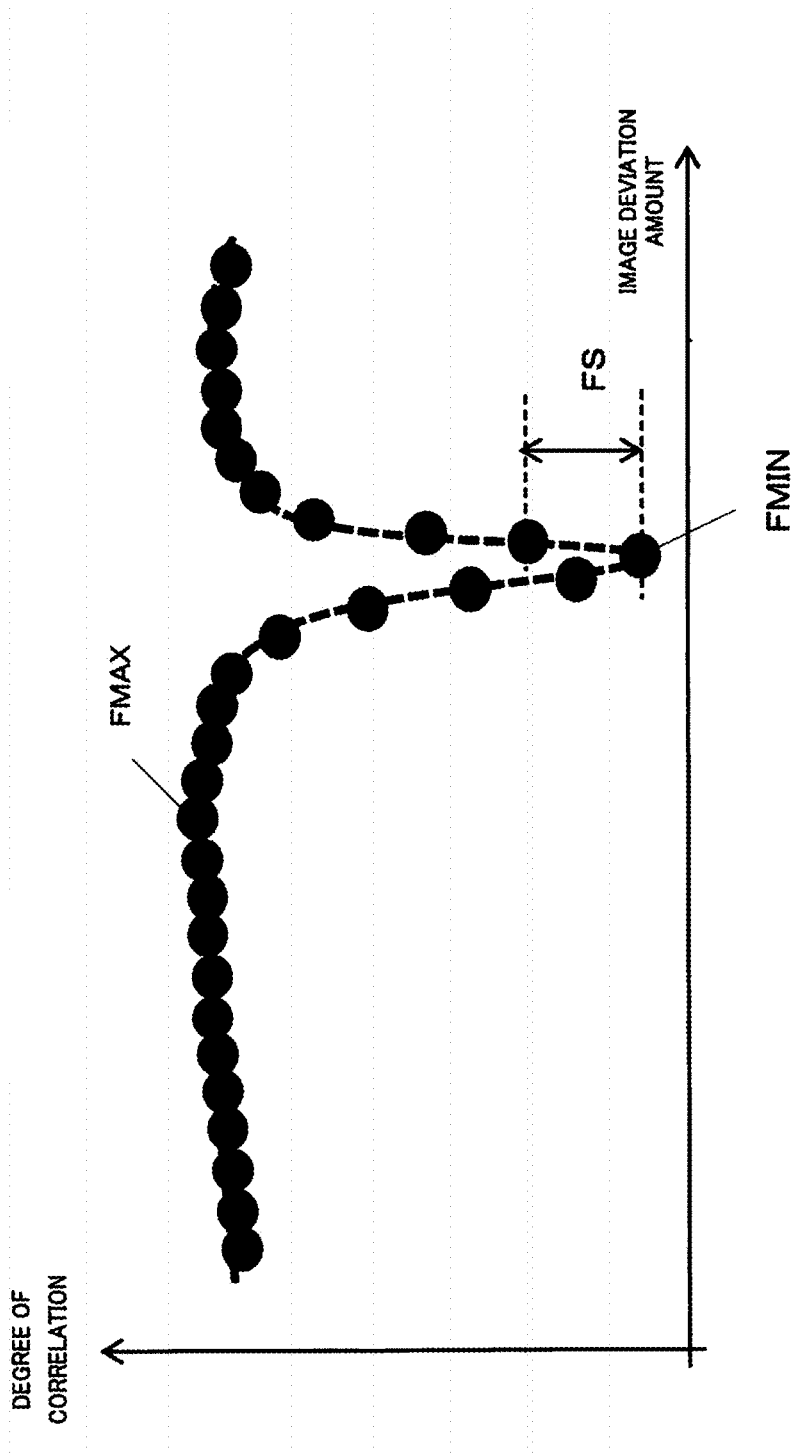
FIG. 12 is a graph for explaining reliability determination after a correlation operation, in the camera of one embodiment of the present invention.

Reliability determination is determination based on the following three conditions.
(B1) If inclination FS of degree of correlation shown in FIG. 12 larger than a threshold value (FS>>threshold value).
(B2) If a difference between a maximum value and a minimum value of the degree of correlation shown in FIG. 12 is larger than a threshold value (FMAX−FMIN>threshold value).
(B3) If contrast value CMIN, which is a difference between a maximum value MAX and a minimum value MIN of the image signal stream of the subject shown in FIG. 10, is calculated, and this contrast value CMIN is larger than a threshold value (CMIN>threshold value).

If (B1) to (B3) above etc. are satisfied, it is determined that reliability determination is OK. It should be noted that threshold values in B1 to B3 are appropriately set in accordance with determination content.

With this embodiment, it is desired to rapidly and accurately achieve an in focus state on a target subject from a significantly defocused state. Therefore, in a significantly defocused state after the 1st release has been pressed down, image deviation amount using the wide focus detection region of area x11 is selected, and the focus lens is moved to the vicinity of an in focus position using this image deviation amount. Once the focus lens reaches the vicinity of the in focus position image deviation amount using the narrow focus detection regions of areas x12 to x15 that have high focus detection precision is selected, and focus adjustment of the focus lens is carried out.

(C1) to (C3) below are therefore used as determination conditions for whether or not the lens is close to being in focus. Specifically, in the event that any of conditions (C1) to (C3) are satisfied, in the vicinity of in focus is determined.
(C1) A number of times the focus lens is driven exceeds a third threshold value.
(C2) A difference between respective image deviation amounts calculated from a wide focus detection region and a narrow focus detection region is below a second threshold value.
(C3) Maximum image deviation amount among absolute values of image deviation amounts of the wide focus detection region is below a first threshold value, there is one or more image deviation amount for which reliability determination of image deviation amount that has been calculated from a narrow focus detection region is OK.

In the following, selection of image deviation amount from a wide focus detection region and a narrow focus detection region will be selected giving an example of a specific subject.

Figure 13:
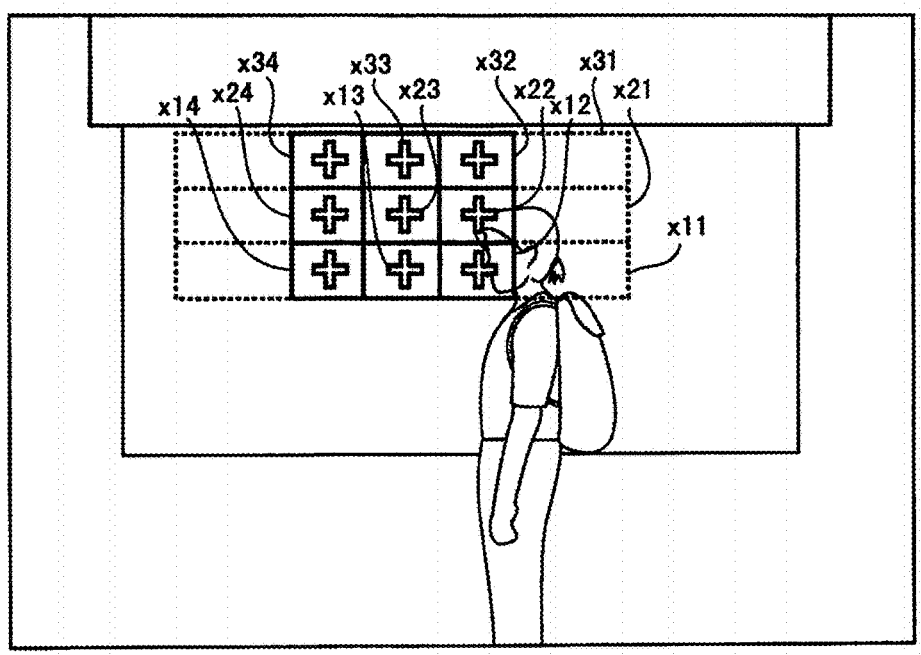
FIG. 13 is a drawing showing a case of focusing on a person just in front, which is one example of a relationship between a subject and distance measurement frames, in the camera of one embodiment of the present invention.

FIG. 13 is one example of the subject, and shows a case where there is a wall in the background, and a person exists in front of the wall, and areas x11 to x14, areas x21 to x24, and areas x31 to x34, which are focus detection regions, are superimposed on this subject.

Figure 14:
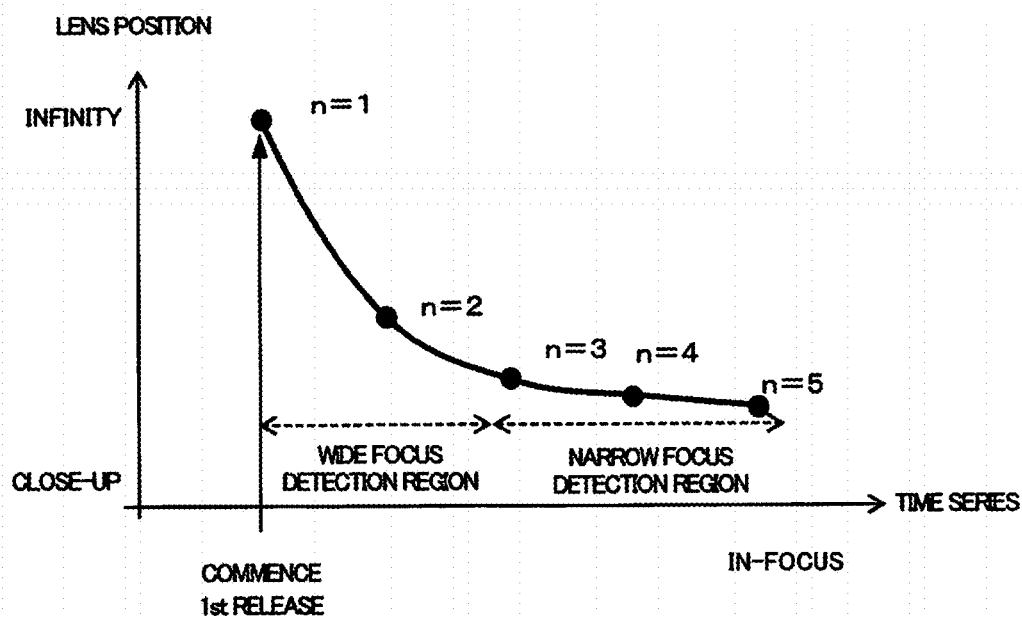
FIG. 14 is a drawing showing a focus lens trajectory after 1st release, in the state shown in FIG. 13, in the camera of one embodiment of the present invention.

FIG. 14 shows focus lens drive trajectory up to focusing on a subject that is at a close up position (a person here), when the 1st release is pressed down from a significantly defocused state where the focus lens is at an infinity position, when shooting a subject such as shown in FIG. 13 described previously.

For focus lens drive based on the initial first and second (n=1, n=2) focus detections after the 1st release has been pressed down, focus detection results of wide focus detection regions (x11, x21, x31) are being selected. With focus lens drive close to in focus after the third focus detection (n=3), since image deviation amount from any of the focus detection regions of the narrow focus detection regions (x12 to x14, x22 to x24, x32 to x34) has a reliability determination of OK, it is possible to select those results with priority.

Specifically, by carrying out focus detection and focus lens drive several times after the 1st release has been pressed down, a subject that is at a closer position is approached (in focus position for a subject that is at a close-up position is approached). A number of times until focus is reached may therefore be set as a threshold value. There is also no problem in excluding image deviation amount using wide focus detection regions that have bad precision in the event that a number of times focus lens drive is performed exceeds a third threshold value. In this case, if the third threshold value is exceeded focus adjustment is carried out based on image deviation amount using narrow focus detection regions that have high precision. This condition corresponds to the condition (C1) described above.

Figure 15:
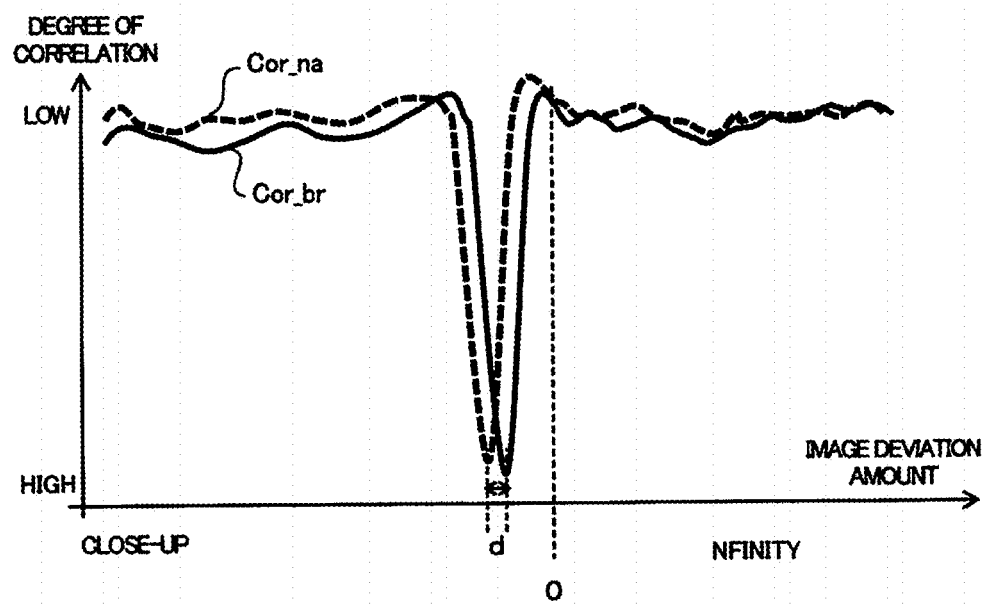
FIG. 15 is a graph showing comparison of the image deviation amounts of each focus detection region at time point n=3 (close up position) in FIG. 14, in the camera of one embodiment of the present invention.

FIG. 15 shows degree of correlation (Cor_br) corresponding to image deviation amount that has been calculated from wide focus detection region (x1) and degree of correlation Cor_na corresponding to image deviation amount that has been calculated from narrow focus detection regions (x12 to x14), for a close to in focus state after the third time (N=3) in FIG. 14. It should be noted that in FIG. 15 center coordinates of each focus detection region are made the same.

In FIG. 15, if an image deviation amount difference d which represents a minimum value of degree of correlation for respective image deviation amounts of a wide focus detection region and a narrow focus detection region, is sufficiently smaller than a second threshold value, then it is determined that the image deviation amount being detected is for the same subject. If the image deviation amount difference d is less than the second threshold value, an image deviation amount that has been calculated from a narrow focus detection region having good precision is thereafter selected instead of image deviation amount that has been calculated in a wide focus detection region. This condition corresponds to the condition (C2) described above.

In the case of a subject such as shown in FIG. 13, it is conceivable that the photographer may wish to focus on a person who is closest, within a subject that is contained narrow focus detection regions (x12-x14, x22-x24, x32-x34). FIG. 16 shows focus detection results for each area immediately after the 1st release has been pressed down (when n=1 in FIG. 14). At this time position of the focus lens is at the infinity position, and focus detection results for wide focus detection regions x11, x21 and x31 are shown by the square marks "☐" (the same also applies to FIG. 17 and FIG. 20 to FIG. 22, which will be described later), while focus detection results for narrow focus detection regions x12 to x14, x22 to x24, x32 to x34 are shown by the circle marks "○" the same also applies to FIG. 17 and FIG. 20 to FIG. 22, which will be described later).

In the state shown in FIG. 16 (when n=1 in FIG. 14), it is desired to select image deviation amount for the wide focus detection region of area x11 in which it is possible to detect a foreground subject (person). At this time, the image deviation amount of the wide focus detection region of area x11 has a maximum value, and since that value L1 exceeds the first threshold value image deviation amount of the wide focus detection region is not excluded. It should be noted that the "x" marks in FIG. 16 show that reliability is low (the same also applies to FIG. 17 and FIG. 20 to FIG. 22, which will be described later). Also, although there are none in FIG. 16, "-" marks show that image deviation amount is excluded (refer to FIG. 17 and FIG. 20 to FIG. 22).

In the state shown in the FIG. 17 (when n=3 in FIG. 14), after the focus lens has been driven twice from pressing down of the 1st release, reliability determination for the image deviation amount of the narrow focus detection region in which a foreground subject (person) is being detected becomes OK. At this time, the image deviation amount of the wide focus detection region of area x11 is a maximum value. Also, since the value L2 of the image deviation amount of area x11 is below the first threshold value, image deviation amounts for the wide focus detection regions x11, x21 and x31 having low accuracy are excluded. As a result, image deviation amounts for the narrow focus detection regions of area x12 and area x22 having good accuracy are selected. This condition corresponds to the condition (C3) described above.

Figure 18:
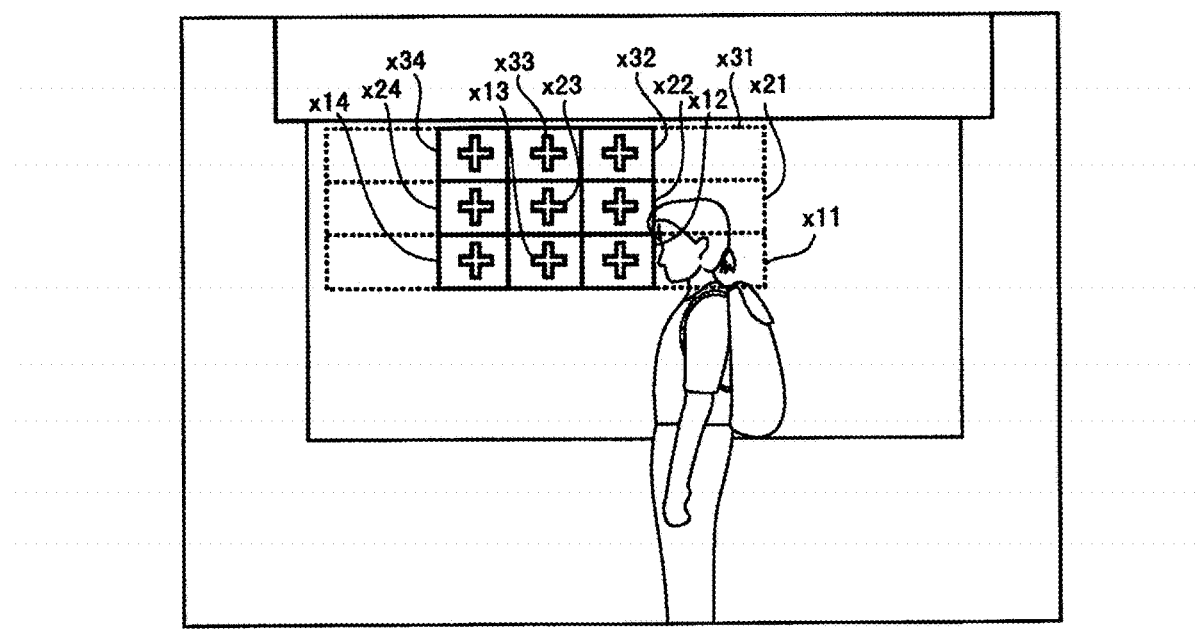
FIG. 18 is a drawing showing a case of focusing on a wall of a background, which is one example of a relationship between a subject and distance measurement frames, in the camera of one embodiment of the present invention.
Figure 19:
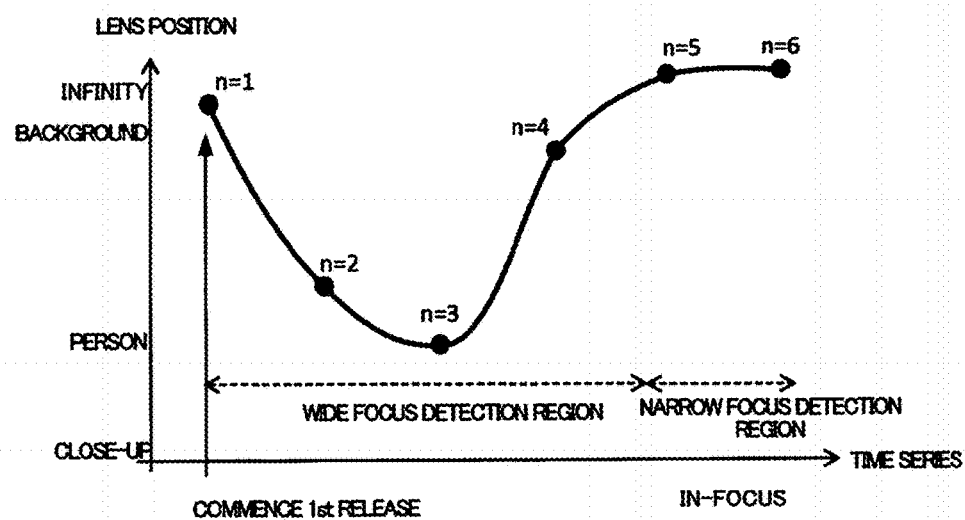
FIG. 19 is a drawing showing a focus lens trajectory after 1st release, in the state shown in FIG. 18, in the camera of one embodiment of the present invention.

Next, a case where ranging frames (ranging areas) have been set with the subject such as shown in FIG. 18 will be described. In this case, it is conceivable that the photographer will want to focus on a wall, which is a subject that is contained in a narrow focus detection region. FIG. 19 shows an example of drive trajectory of the focus lens in a case where ranging frames (ranging areas) have been set with a subject such as shown in FIG. 18.

Figure 20:
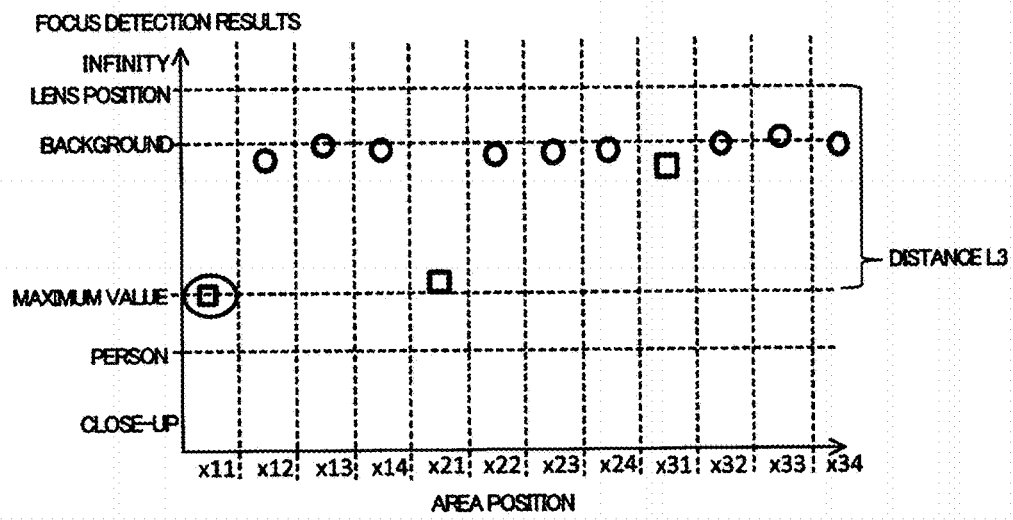
FIG. 20 is a drawing showing focus results for each area, at time point n=1 (infinity position) in FIG. 19, in the camera of one embodiment of the present invention.

The state shown in FIG. 20 (when n=1 in FIG. 19) is immediately after the 1st release has been pressed down (when n=1), and the focus lens is at the infinity position. Then, similar to the case that was described with FIG. 13 to FIG. 17, image deviation amounts of the wide focus detection regions of area x11 and area x21 are selected and the focus lens will be moved towards a subject (person) at a close up position. At this time, the image deviation amount of the wide focus detection region of area x11 has a maximum value (closest), and since that value L3 exceeds the first threshold value image deviation amounts of the wide focus detection regions x11, x21 and x31 are not excluded.

The state shown in FIG. 21 is after lens drive a second time after the 1st release has been pressed down (when n=3 in FIG. 19), and the focus lens is close to the close up position. In this state reliabilities of the areas x12 to x14, x22 top x24 and c32 to x34 are all NG (significantly blurred state), that is, there are no image deviation amounts for which reliability determination using a narrow focus detection region is OK. As a result it is determined that it is not possible to focus on a subject that is at a close up position.

In the state shown in FIG. 21 (when n=3 in FIG. 19, an image deviation amount of a wide focus detection region of area x11 has a maximum value, and that value L4 is below the first threshold value, but reliabilities of the narrow focus detection regions are all NG, and a subject that the photographer wants to focus on does not exist at the close up position. As a result, image deviation amounts for the wide focus detection regions of area x11 and area x21, which are at a position that is more towards the close-up end than the current lens position, are excluded. Also, the image deviation amount of wide focus detection region x31 does not indicate close to in focus, and its sign is negative (infinity end). As a result, drive of the focus lens is carried out based on image deviation amount from the wide focus detection region x31.

The state shown in FIG. 22 is after lens drive a fourth time after the 1st release has been pressed down (when n=5 in FIG. 19), and the focus lens is close to the infinity position. Since an image deviation amount for which reliability determination using a narrow focus detection region is OK exists, image deviation amount of a narrow focus detection region having good accuracy is selected.

Conversely, in the state of FIG. 21 and FIG. 22, in a case where image deviation amounts of wide focus detection regions where the close up position has been detected are not excluded, a phenomenon arises where, after driving to the infinity position again, there is drive to the close up position again, resulting in hunting where there is reciprocation between the infinity position and the close up position due to this movement being repeated. However, as was described previously, with this embodiment, since image deviation amount for a wide focus detection region which is detecting the close up position is excluded, hunting can be prevented.

Processing to exclude image deviation amounts of wide focus detection regions for the close up position, shown in FIG. 21, is preferably maintained in order to prevent hunting, unless it is determined that a subject being photographed has changed. In the event that any of the conditions (D) to (F) below are satisfied, it is determined that a subject being photographed has changed, and the exclusion processing is cancelled.

(D) When angle of view being photographed has changed due to the camera shaking laterally or vertically, or lens focal length (zoom) being changed.

(E) When there has been a start over from focus detection processing immediately after 1st release has been pressed down due to 1st release being completed, reliability determination of focus detection results with continuous AF continues to be NG etc.

(F) When scan drive is executed to give high-speed drive of the focus lens from the infinity end to the close-up end, due to failure to come closer to a subject, reliability determination of focus detection results continuing to be NG etc.

Figure 23B:
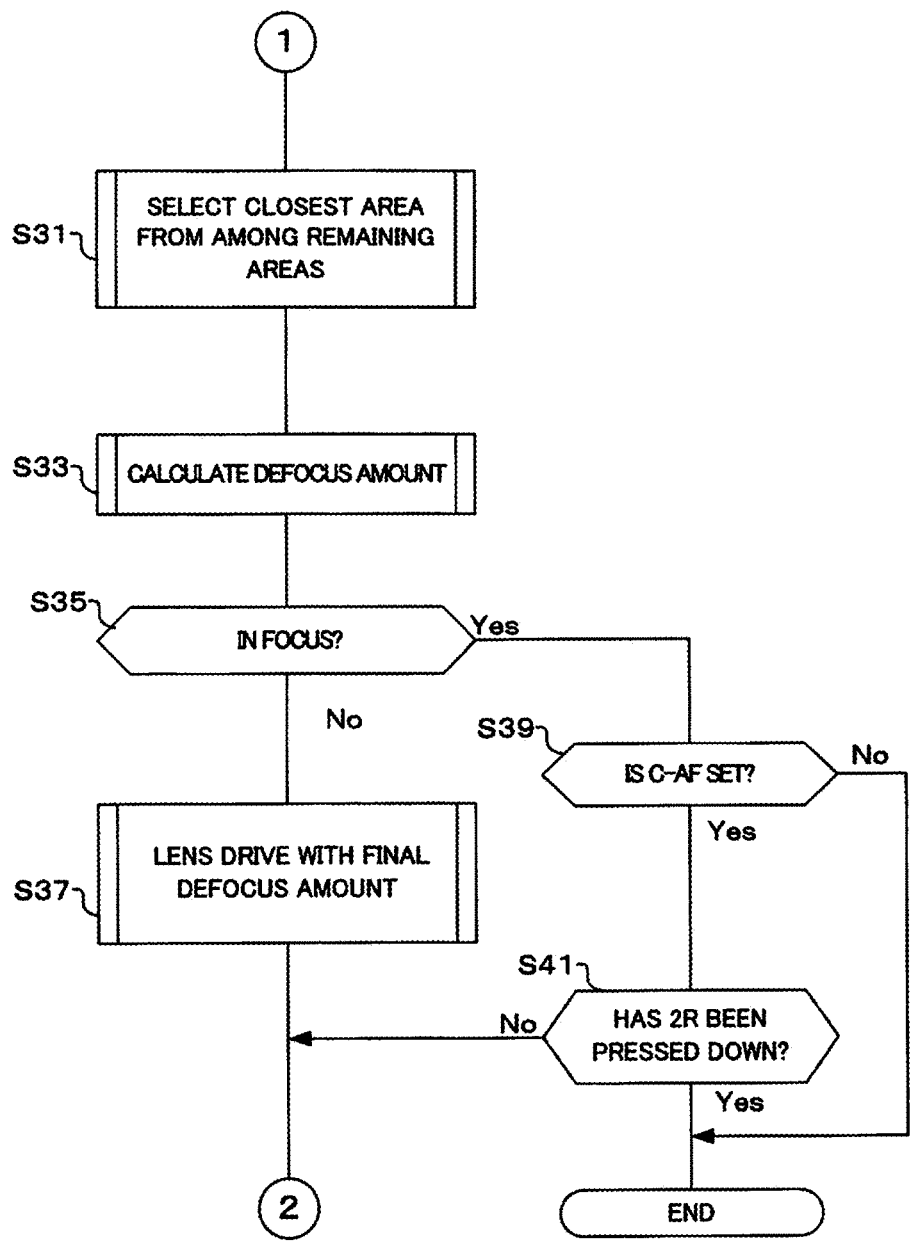

Next, a focus adjustment operation of this embodiment will be described using the flowcharts shown in FIG. 23A and FIG. 23B. This flow is executed by the CPU etc. that is provided within the AF calculation section 23 controlling each section shown in FIG. 1 and FIG. 2 based on programs that have been stored in non-volatile memory within the AF calculation section 23.

If the release button is pressed down half way (1st release), the flow for focus adjustment shown in FIG. 23A is commenced. First, focus detection is carried out in a narrow focus detection region (S1). Here, the ranging area setting section 35 sets a plurality of narrow focus detection regions that are capable of being set (for example, x12 to x14), and calculates image deviation amount based on pixel values of ranging pixels within each area of the plurality of narrow focus detection regions.

Once image deviation amounts of the narrow focus detection regions have been calculated, next focus detection is carried out for a wide focus detection region (S3). Here, the ranging area setting section 35 sets a wide focus detection region that is capable of being set (for example, x11), and calculates image deviation amount based on pixel values of ranging pixels within each area of the wide focus detection region.

Once focus detection has been carried out in the wide focus detection region, it is next determined whether or not reliability of results for the narrow focus detection regions is OK (S5). Here, the defocus amount calculating section/reliability evaluation section 37 carries out the reliability evaluation that was described using FIG. 7 on the results of focus detection that were acquired in step S1, and determination is based on this evaluation.

If the determination result in step S5 is that reliability is OK, it is next determined whether or not reliability of the results for the wide focus detection region is OK (S7). Here, the defocus amount calculating section/reliability evaluation section 37 carries out the reliability evaluation that was described using FIG. 7 on the results of focus detection that were acquired in step S3, and determination is based on this evaluation. On the other hand if the result of determination is that reliability is not OK, then since reliability of the narrow focus detection results is OK processing advances to step S31 where a final image deviation amount will be determined from the plurality of focus detection results for this narrow focus detection region.

If the result of determination in S7 is that reliability is OK, it is next determined whether or not a subject exists that is close to being in focus (S9). Here, it is determined whether or not a subject exists close to the current focus lens position. In the event that image deviation amount from the wide focus detection region is smaller than the first threshold value, it can be determined that a subject exists close to being in focus. This state corresponds to a case where distance L2 in FIG. 17 is smaller than the first threshold value, and also corresponds to a state where n=3 in FIG. 14. Also, in the event that a subject does not exist close to being in focus, this corresponds, for example, to FIG. 16 (n=1 in FIG. 14). If the result of this determination is that a subject that is close to an focus does not exist, then since reliabilities of both detection regions, namely the narrow focus detection regions around the wide focus detection region, are OK, processing advances to step S31 where a final image deviation amount is determined from a plurality of focused detection results of both detection regions. In FIG. 16, image deviation amount of wide focus detection region x11 representing the closest focus position is selected and determined (step S31).

It should be noted that in step S9, besides determination as to whether or not a subject that is close to being in focus exists, the following determination methods may also be carried out. It is determined whether or not a difference between image deviation amount of the wide focus detection region and image deviation amount of a narrow focus detection region is smaller than the second threshold value, and processing advances to step S11 if the difference is smaller than the second threshold value, with results for the wide focus detection region excluded, and image deviation amount of the narrow focus detection region adopted. This is a case where a difference d between image deviation amounts is smaller than the second threshold value, and the above described condition (C2) is satisfied, as was described in FIG. 15.

If the result of determination in step S9 is that a subject exists close to being in focus, next, results of the wide focus detection region are excluded (S11). Since the result of determination in step S9 was Yes, image deviation amount within the narrow focus detection regions does not become a significantly defocused state and it is possible to accurately perform focus detection, and so results of focus detection using the wide focus detection region are used. This corresponds, for example, to FIG. 17 (n=3 in FIG. 14) and FIG. 22 (n=5 in FIG. 19).

If results for the wide focus detection region have been excluded in step S11, processing advances to step S31, where a final image deviation amount is determined from detection results of the narrow focus detection regions. In FIG. 17, wide focus detection regions x11 and x21 are excluded, and image deviation amount of narrow focus detection region x12 is selected and determined (step S31). Also, in FIG. 22, wide focus detection regions x11, x12 and x13 are excluded, and image deviation amount of x23 is selected from among the narrow focus detection regions and determined (step S31).

Returning to step S5, if the determination result is that reliability of the narrow focus detection region is not OK, it is next determined whether or not reliability of the results for the wide focus detection region is OK (S13). Here, the defocus amount calculating section/reliability evaluation section 37 carries out the reliability evaluation that was described using FIG. 7 on the results of focus detection that were acquired in step S3, and determination is based on this evaluation.

If the result of determination in S13 is that reliability is OK, it is next determined whether or not a subject exists that is close to being in focus (S15). Here, it is determined whether or not a subject exists close to the current focus lens position. In the event that image deviation amount from the wide focus detection region is smaller than the first threshold value, it can be determined that a subject exists close to being in focus. If the result of determination in step S15 is that a subject that is close to being in focus does not exist, processing advances to step S31 where a final image deviation amount is determined from detection results for the wide focus detection region.

If the result of determination in step S15 is that a subject exists close to being in focus, next, results of the wide focus detection region at the close-up side are excluded (S17). Here, results for the close up side, among image deviation amounts from the wide focus detection regions x11, x21 and x31, are excluded. This corresponds to results for areas x11 and x21, that constitute image deviation amount for the close up side, being excluded, in FIG. 21. If results for wide focus detection region at the close up side have been excluded in step S17, processing advances to step S31 where a final image deviation amount is determined from detection results other than those that have been excluded. In FIG. 21, since wide focus detection regions x11 and x12 have been excluded, and reliabilities for all of the narrow focus detection region are not OK, image deviation amount for wide focus detection region x31 is selected (step S31).

Returning to step S13, if the result of this determination is that results for the wide focus detection region do not have a reliability of OK, it is next determined whether or not the subject has changed (S19). In this case, reliability is not OK for both results of the narrow focus detection regions and results of the wide focus detection region (S5 No, S13 No). This type of situation is a case where the subject itself has moved, a case where the photographer has changed the shooting direction of the camera, or a case where the camera has carried out zooming to change the angle of view etc. It is also a case where the above described conditions (E), (F) etc. are satisfied. In this step it is determined whether or not these conditions are satisfied.

If the result of determination in step S19 is that the subject has not changed, exclusion processing continues (S21). Here, the exclusion processing of step S11 and step S17 continues.

On the other hand, if the result of determination in step S19 is that the subject has changed, exclusion processing is canceled (S23). Here, the exclusion processing of step S11 and step S17 is canceled.

If the exclusion processing continues in step S21, or if the exclusion processing of step S23 is cleared, processing returns to step S1 and the previously described operations are repeated.

If the result of determination in step S7 is No, or if the result of determination in step S9 is No, or if the exclusion processing is carried out instep S11, or if the result of determination in step S15 is No, or if exclusion processing is carried out in step S17, next the closest area from among the remaining areas is selected (S31). Here, an area representing the closest position from among remaining areas with the processing thus far is selected.

Next, defocus amount is calculated (S33). Here, defocus amount is calculated using image deviation amount of the area that was selected in step S31, using equation (1) below.

Once defocus amount has been calculated, it is next determined whether or not focus has been achieved (S35). Here it is determined whether or not the defocus amount that was calculated in step S33 is 0 or close to 0 (within a given range).

If the result of determination in step S35 is that focus has not been achieved, lens drive is carried out using a final defocus amount (S37). Here, the AF calculation section 23 calculates drive amount of the focus lens based on the defocus amount that was calculated in step S33, and moves the focus lens to an in focus position using the actuator 12 by means of the lens control section 13. If lens drive has been carried out processing returns to step S1, and the previously described processing is executed.

On the other hand, if the result of determination in step S35 is in focus, it is determined whether or not C-AF (continuous AF mode) is active (S39). C-AF is manually set by the user on an AF-mode setting screen or the like, and so determination is based on this setting condition. If the result of this determination is that C-AF mode has not been set, the flow for this focus adjustment operation is terminated.

On the other hand, if the result of determination in step S39 is that C-AF mode has been set, it is next determined whether or not 2R has been pressed down (S41). In the event that composition etc. has been determined and shooting is carried out, the user carries out full pressing of the release button (2R release). Here, determination is based on the operating condition of the release button. If the result of this determination is not 2R release, then since C-AF mode is being maintained, processing returns to step S1, and the previously described processing is carried out. On the other hand, if 2R release has been performed, the flow for this focus adjustment operation is terminated and there is a transfer to an actual shooting operation.

With the above described one embodiment of the present invention, there are the following features (1) to (4).

(1) Any focus detection results are always calculated within in a given period, from a wide focus detection region in which it is possible to detect a significantly defocused state (for example, x11) and at least one narrow focus detection region that has been set within that wide focus detection region (for example, x12 to x14), and reliability of the focus detection results is determined (refer, for example, to FIG. 9 to FIG. 12, and S1 and S3 in FIG. 23A). This means that even when subjects that are far away and subjects that are close are mixed together, it is possible to reliably focus on a subject that the photographer wants to focus on, even in a state where the focus lens becomes close to an in-focus state from a significantly defocused state.

(2) Rapid focus determination is carried out by excluding calculation results for a wide focus detection region that has bad detection accuracy in accordance with conditions that determine that a subject is close to being in focus, and selecting calculation results of narrow focus detection regions having good detection accuracy (refer, for example, to FIG. 13 to FIG. 17, and S5 to S11 in FIG. 23A). By carrying out this processing, it is possible to focus with good detection accuracy in a case where a focus lens moves from a position of a significantly defocused state to being close to in focus. With this embodiment, as conditions that a subject is close to being in focus, any one of conditions (C1) to (C3) described above may be satisfied. The following conditions (G1) to (G3), which are amendments to conditions (C1) to (C3), may also be used.

(G1) When a number of times the focus lens is driven, after the 1st release has been pressed down with the subject in a significantly defocused state, exceeds a threshold value.

(G2) When reliability determinations for respective image deviation amounts that have been calculated from a wide focus detection region and narrow focus detection regions are both OK, and a difference between image deviation amounts is below a threshold value.

(G3) When the largest detection result, among absolute values of image deviation amount for at least one wide focus detection region of which reliability determination is OK, is below a threshold value, and there is at least one determination result having a reliability determination OK for image deviation amount that has been calculated from a narrow focus detection region.

(3) All detection results for a wide focus detection region that have been detected closer than the driven focus lens position are excluded in accordance with conditions that determine that a subject that is close to being in focus at the current focus lens position does not exist in an imaging range in which the photographer wishes to focus (refer, for example, to FIG. 18 to FIG. 12, and S13 to S17 in FIG. 23A).

It should be noted that the condition that a subject does not exist in an imaging range is a case where the largest detection result, among the absolute values of image deviation amount for a wide focus detection region that has at least one reliability determination of OK, is below a threshold value, and not even a single detection result exists that has a reliability determination for image deviation amount, that has been calculated from a narrow focus detection region, of OK. By carrying out the processing for (3) described above, it is possible to prevent false focusing in the event that the subject does not exist at the close up end.

(4) With the processing in (3) above, it is determined that a subject being photographed has not changed significantly unless a reset condition is satisfied, and a state where all detection results, for a wide focus detection region detected more to the close up side than a focus lens position being driven to, are excluded is maintained (for example, S19 to S23 in FIG. 23A). By carrying out this processing it is possible to prevent hunting etc.

The reset condition for the above described maintaining state may be satisfying any one of the above described conditions (D) to (F). The following conditions (H1) to (H3), which are amendments to conditions (D) to (F), may also be used.

(H1) When angle of view of a subject being photographed changes (for example, the photographer performing pan or tilt of the camera, zoom change of a lens etc.).

(H2) When there has been a start over from focus detection processing immediately after 1st release has been pressed down due to 1st release being completed, reliability of determination of focus detection results with continuous AF continuing to be NG etc.

(H3) Executing drive of the focus lens at high-speed from the infinity end to the close-up end, because it was not possible to detect in focus position of the subject.

As has been described above, with one embodiment of the present invention, a subject image that has been subjected to pupil vision by a photographing lens that includes a focus lens is captured to generate image data, and a focus adjustment operation is carried out based on the image data. A first focus detection region (refer, for example, to wide focus detection region x11 in FIG. 9) and a second focus detection region that is contained in the first focus detection region and that is narrower than first focus detection region (for, for example, to narrow focus detection regions x12 to x14 in FIG. 9) are set in an imaging region, phase difference detection is carried out based on image data of the first focus detection region or the second focus detection region, and a first phase difference amount or a second phase difference amount are respectively calculated (refer, for example, to S1 and S3 in FIG. 23A).

Also, with this embodiment, it is determined whether or not reliability of phase detection results is high (refer, for example, to FIG. 7 and S5, S7, S9 and S13 in FIG. 23A), a focus adjustment operation is carried out based on the first phase difference amount in a case where it has been determined that the first phase difference amount is larger than a first threshold value, and then by executing focus detection by the focus calculation section after a focus adjustment operation, if it has been determined that reliability of both the first phase difference amount and a second phase difference amount is high, and that a difference between both of phase difference amount is smaller than a second threshold value, and it has been determined that the first phase difference amount is smaller than the first threshold value, a focus adjustment operation is carried out based on the second phase difference amount.

It should be noted that with the one embodiment of the present invention phase difference AF where phase difference AF detection pixels are arranged on an image sensor 21 adopted for the purpose of phase difference AF detection. However, this is not limiting and a phase difference detection section may be provided separately to the image sensor 21.

Also, with the one embodiment of the present invention, the face detection section 22a and tracking section 22b within the image processing section 22 respectively have a face detection circuit and a tracking circuit, but instead of hardware circuits they may also be configured as software using a CPU and programs, may be implemented by hardware circuits such as gate circuits that are generated based on a programming language described using Verilog, or may be configured using a DSP (Digital Signal Processor). Suitable combinations of these approaches may also be used. The use of a CPU is also not limiting as long as elements fulfill a function as a controller.

Also, regarding each of the sections within the AF calculation section 23, besides being constructed in the form of software using a CPU and programs, some or all of these sections may be constructed with hardware circuits, or may have a hardware structure such as gate circuitry generated based on a programming language described using Verilog, or may use a hardware structure that uses software, such as a DSP (digital signal processor). Suitable combinations of these approaches may also be used. Calculation of defocus amount, calculation of reliability evaluation values and contrast evaluation values, and generation of phase difference pixels etc. has been carried out by repeating uniform calculation processing, but these operations may also be configured using hardware circuits. The use of a CPU is also not limiting as long as elements fulfill a function as a controller.

Also, with the one embodiment of the present invention, an instrument for taking pictures has been described using a digital camera, but as a camera it is also possible to use a digital single lens reflex camera or a mirrorless camera or a compact digital camera, or a camera for movie use such as a video camera, and further to have a camera that is incorporated into a mobile phone, a smartphone, a mobile information terminal, personal computer (PC), tablet type computer, game console etc., or a camera for medical use, or a camera for a scientific instrument such as a microscope, a camera for mounting on a vehicle, a surveillance camera etc. In any event, it is possible to adopt the present invention as long as a device carries out focus detection using phase difference AF.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment device, comprising:
    an image sensor that outputs image data by forming a subject image that has been subjected to pupil division by means of a photographing lens that includes a focus lens,
    and a controller that carries out a focus adjustment operation based on the image data, the controller comprising:

a focus detection region setting section that sets a first focus detection region, and a second focus detection region that is contained in the first focus detection region, and that is narrower than the first focus detection region, a focus calculation section that carries out phase difference detection based on image data of the first focus detection region or the second focus detection region, and respectively calculates first phase difference amount or second phase difference amount, a reliability determination section that determines whether or not reliability of result of the phase difference detection is high, and a control section that carries out a focus adjustment operation based on phase difference amount calculated by the focus calculation section, wherein, the control section carries out a focus adjustment operation based on the first phase difference amount in the event that it has been determined that the first phase difference amount is larger than a first threshold value, and then by executing focus detection using the focus calculation section after the focus adjustment operation, in the event that it has been determined that reliability of both the first phase difference amount and the second phase difference amount is high, and that a difference between the two is smaller than a second threshold value, and that it has been determined that the first phase difference amount is smaller than the first threshold value, a focus adjustment operation is carried out based on the second phase difference amount.

2. The focus adjustment device of claim 1, wherein:
the focus detection region setting section sets a plurality of the first focus detection regions, and
the control section makes a maximum value, among a plurality of the first phase difference amounts that have been calculated for the plurality of first focus detection regions by the focus calculation section, the first phase difference amount.

3. The focus adjustment device of claim 2, wherein:
the focus detection region setting section sets second focus detection regions, respectively contained in the plurality of first focus detection regions, that are narrower than the first focus detection regions, and
the control section carries out a focus adjustment operation based on the first phase difference amount in the event that it has been determined that the first phase difference amount is larger than a first threshold value, and then by executing focus detection using the focus calculation section after the focus adjustment operation, in the event that reliabilities of all of a plurality of second phase difference amounts that have been detected are poor, and that it has been determined that a maximum value, among absolute values of a plurality of first phase difference amounts that have been detected, is smaller than the first threshold value, a focus adjustment operation is carried out based on a phase difference amount showing a negative value, among the plurality of first phase difference amounts.

4. The focus adjustment device of claim 3, wherein
the controller has an angle of view change determination section that determines change in shooting angle of view of the focus adjustment device, and wherein
the control section continues focus adjustment operation based on phase difference amount showing a negative value, among the plurality of first phase difference amounts, until it is determined by the angle of view change determination section that angle of view of the shooting region has changed.

5. The focus adjustment device of claim 4, wherein:
the photographing lens includes a variable power optical system, and
the angle of view change determination section determines change of the shooting angle of view based on change in focal length of the variable power optical system.

6. The focus adjustment device of claim 4, wherein:
the focus adjustment device has an attitude detection sensor that detects attitude of the focus adjustment device, and
the angle of view change determination section determines change in shooting angle of view based on output of the attitude detection sensor.

7. A focus adjustment method, that carries out a focus adjustment operation in a focus adjustment device based on image data, the image data having been generated by capturing a subject image that has been subjected to pupil division by means of a photographing lens that includes a focus lens, comprising:
in an imaging region, setting a first focus detection region, and a second focus detection region, that is contained in the first focus detection region, and that is narrower than the first focus detection region,
carrying out phase difference detection based on image data of the first focus detection region or the second focus detection region, and respectively calculating first phase difference amount or second phase difference amount,
determining whether or not reliability of results of the phase difference detection is high, and
carrying out a focus adjustment operation based on the first phase difference amount in the event that it has been determined that the first phase difference amount is larger than a first threshold value, and then by executing focus detection using the focus calculation section after the focus adjustment operation, in the event that it has been determined that reliability of both the first phase difference amount and the second phase difference amount is high, and that a difference between the two is smaller than a second threshold value, and that it has been determined that the first phase difference amount is smaller than the first threshold value, a focus adjustment operation is carried out based on the second phase difference amount.

8. The focus adjustment method of claim 7, wherein
there are a plurality of the first focus detection regions, and the focus adjustment method further comprises
making a maximum value, among a plurality of the first phase difference amounts that have been calculated for the plurality of first focus detection regions by the focus calculation section, the first phase difference amount.

9. The focus adjustment method of claim 8, further comprising;
setting second focus detection regions, respectively contained in the plurality of first focus detection regions, that are narrower than the first focus detection regions, and
carrying out a focus adjustment operation based on the first phase difference amount in the event that it has been determined that the first phase difference amount is larger than a first threshold value, and then by executing focus detection after the focus adjustment operation, in the event that reliabilities of all of a plurality of second phase difference amounts that have been detected are not high, and that it has been determined that a maximum value, among absolute values of a plurality of first phase difference amounts that have been detected, is smaller than the first threshold value, a focus adjustment operation is carried out based on a phase difference amount showing a negative value, among the plurality of first phase difference amounts.

10. The focus adjustment method of claim 9, further comprising:
   determining change in shooting angle of view of the focus adjustment device, and
   continuing focus adjustment operation based on phase difference amount showing a negative value, among the plurality of first phase difference amounts, until it is determined that angle of view of the shooting region has changed.

11. The focus adjustment method of claim 10, wherein:
   the photographing lens includes a variable power optical system, and the focus adjustment method comprises
   determining change in shooting angle of view based on change in focal length of the variable power optical system.

12. The focus adjustment method of claim 10, wherein:
   the focus adjustment device has an attitude detection sensor that detects attitude of the focus adjustment device, and the focus adjustment method comprises
   determining change in shooting angle of view based on output of the attitude detection sensor.

13. A non-transitory computer-readable medium storing a processor executable code, which when executed by at least one processor, performs a focusing adjustment method, the processor being included in a focus adjustment device that images a subject that has been subjected to pupil division by means of a photographing lens that includes a focus lens to generate image data, and carries out a focus adjustment operation based on the image data, the focusing adjustment method comprising:
   in an imaging region, setting a first focus detection region, and a second focus detection region, that is contained in the first focus detection region, and that is narrower than the first focus detection region,
   carrying out phase difference detection based on image data of the first focus detection region or the second focus detection region, and respectively calculating first phase difference amount or second phase difference amount,
   determining whether or not reliability of result of the phase difference detection is high, and
   carrying out a focus adjustment operation based on the first phase difference amount in the event that it has been determined that the first phase difference amount is larger than a first threshold value, and then by executing focus detection using the focus calculation section after the focus adjustment operation, in the event that it has been determined that reliability of both the first phase difference amount and the second phase difference amount is high, and that a difference between the two is smaller than a second threshold value, and that it has been determined that the first phase difference amount is smaller than the first threshold value, a focus adjustment operation is carried out based on the second phase difference amount.

14. The non-transitory computer-readable medium of claim 13, the focus adjustment method comprising:
   having a plurality of the first focus detection regions, and
   making a maximum value, among a plurality of the first phase difference amounts that have been calculated for the plurality of first focus detection regions by the focus calculation section, the first phase difference amount.

15. The non-transitory computer-readable medium of claim 14, the focus adjustment method comprising:
   setting second focus detection regions, respectively contained in the plurality of first focus detection regions, that are narrower than the first focus detection regions, and
   carrying out a focus adjustment operation based on the first phase difference amount in the event that it has been determined that the first phase difference amount is larger than a first threshold value, and then by executing focus detection after the focus adjustment operation, in the event that reliabilities of all of a plurality of second phase difference amounts that have been detected are not high, and that it has been determined that a maximum value, among absolute values of a plurality of first phase difference amounts that have been detected, is smaller than the first threshold value, a focus adjustment operation is carried out based on a phase difference amount showing a negative value, among the plurality of first phase difference amounts.

16. The non-transitory computer-readable medium of claim 15, the focus adjustment method comprising:
   determining change in shooting angle of view of the focus adjustment device, and
   continuing focus adjustment operation based on phase difference amount showing a negative value, among the plurality of first phase difference amounts, until it is determined that angle of view of the shooting region has changed.

17. The non-transitory computer-readable medium of claim 16, wherein:
   the photographing lens includes a variable power optical system, and the focus adjustment method comprises
   determining change in shooting angle of view based on change in focal length of the variable power optical system.

18. The non-transitory computer-readable medium of claim 16, wherein:
   the focus adjustment device has an attitude detection sensor that detects attitude of the focus adjustment device, and the focus adjustment method comprises
   determining change in shooting angle of view based on output of the attitude detection sensor.

* * * * *